(12) United States Patent
Chen et al.

(10) Patent No.: US 9,674,542 B2
(45) Date of Patent: Jun. 6, 2017

(54) MOTION VECTOR PREDICTION FOR VIDEO CODING

(71) Applicant: QUALCOMM Incorporated, San Diego, CA (US)

(72) Inventors: Ying Chen, San Diego, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 365 days.

(21) Appl. No.: 14/144,058

(22) Filed: Dec. 30, 2013

(65) Prior Publication Data

US 2014/0185682 A1 Jul. 3, 2014

Related U.S. Application Data

(60) Provisional application No. 61/748,424, filed on Jan. 2, 2013.

(51) Int. Cl.
| | |
|---|---|
| H04N 19/46 | (2014.01) |
| H04N 19/597 | (2014.01) |
| H04N 19/52 | (2014.01) |
| H04N 19/58 | (2014.01) |
| H04N 19/573 | (2014.01) |

(52) U.S. Cl.
CPC ............ *H04N 19/46* (2014.11); *H04N 19/52* (2014.11); *H04N 19/573* (2014.11); *H04N 19/58* (2014.11); *H04N 19/597* (2014.11)

(58) Field of Classification Search
CPC ...... H04N 19/46; H04N 19/52; H04N 19/573; H04N 19/58; H04N 19/597
See application file for complete search history.

(56) References Cited

U.S. PATENT DOCUMENTS

| | | | | |
|---|---|---|---|---|
| 2013/0114742 | A1* | 5/2013 | Hannuksela | H04N 19/00533 375/240.25 |
| 2014/0016701 | A1* | 1/2014 | Chen | H04N 19/105 375/240.14 |

FOREIGN PATENT DOCUMENTS

WO 2012145670 A1 10/2012

OTHER PUBLICATIONS

Chen et al. ("Temporal motion vector prediction hook for MV-HEVC", JCTVC-K0239, Shanghai, China, Oct. 10-19, 2012).*
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.

(Continued)

*Primary Examiner* — Behrooz Senfi
*Assistant Examiner* — Maria Vazquez Colon
(74) *Attorney, Agent, or Firm* — Shumaker & Sieffert, P.A.

(57) ABSTRACT

In one example, a device for coding video data includes a video coder configured to determine a first target reference index representing a reference picture to which a candidate motion vector predictor for a current motion vector refers, determine, for the candidate motion vector predictor and during temporal motion vector prediction (TMVP) of the current motion vector, a value for an additional target reference index that is equal to a predetermined value, and code the current motion vector based at least in part on the value of the additional reference index.

30 Claims, 8 Drawing Sheets

(56) References Cited

OTHER PUBLICATIONS

Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
Bici, et al., "Non-CE9: Removal of reference index derivation for TMVP in merge mode", Joint Collaborative Team on Video Coding (JCT-VC) of ITU-T SG1.6 WP3 ancl ISO/IEC JTCIISC29NBrG11 7th Meeting: Geneva, CH, Nov. 21-30, 2011, Input Document to JCT-VC, Nokia, URL: HTTP://WFTP3.ITU.INT/AV-ARCH/JCTVC-SITE/,, No. JCTVC-G592, Nov. 8, 2011 (Nov. 8, 2011), XP030110576, pp. 1-3.
Chen, et al., "Temporal motion vector prediction hook for MV-HEVC", JCT-VC Meeting; MPEG Meeting; Oct. 10-19, 2012; Shanghai; (Joint Collaborative Team on Video Coding of ISO/IEC JTC1/SC29/WG1-1 and ITU-T SG.16); URL: HTTP:// WFTP3.1TU.INT/ AV-ARCH/JCTVC-SITE/, No. JCTVC-K0239, XP030113121.
Jeon, et al., "Non-CE9: simplification of merge/skip TMVP ref_idx derivation," Document: JCTVC-G163, M21716, Joint Collaborative Team on Video Coding (JCT-VC) of ITU-T SG16 WP3 and ISO/IEC JTC1/SC29/WG11, 7th Meeting: Geneva, CH, Nov. 19-30, 2011, 12 pp.
Takahashi, et al., "Cross-check report of JCTVC-KO239", Input Document to JCT-VC, Joint Collaborative Team on Vicleo Cocling (JCT-VC) of ITU-T SG 16 WP 3 and ISO/IEC JTC 1/SC 29WG, 11th Meeting: Shanghai, CN, Oct. 10-19, 2012, URL: HTTP:// WFTP3.ITU.INT/AV-ARCH/JCTVC-SITE/, No. JCTVC-K0306, XP030113188, 3 pp.
Tech, et al., "MV-HEVC Draft Text 2," Document: JCT3V-B1004-d0, Oct. 13-19, 2012, 22 pp.
Hannuksela, et al., "3D-AVC Draft Text 4," Document: JCT3V-B1002, Oct. 13-19, 2012, 72 pp.
Tech, et al., "3D-HEVC TEst Model 2," Document: JCT3V-B1005_d0, Oct. 13-19, 2012, 118 pp.
Chen, et al., "Temporal motion vector prediction hook for MV-HEVC," Document: JCTVC-K023, dated Oct. 10-19, 2012, 9 pp.
Bross et al., "High efficiency video coding (HEVC) text specification draft 9," 11th Meeting: Shanghai, CN, Oct. 10-19, 2012, JCTVC-K1003_v13, 317 pp.
International Search Report and Written Opinion from International Application No. PCT/US2013/078501, dated Apr. 7, 2014, 13 pp.
Second Written Opinion from International Application No. PCT/US2013/078501, dated Feb. 4, 2015, 7 pp.
Suzuki, et al., "Study Text of ISO/IEC 14496-10:2012/DAM2 MVC extension for inclusion of depth maps," ISO/IEC JTC1/SC29/WG11, MPEG2012/N13140, Oct. 2012, 81 pp.

* cited by examiner

MOTION VECTOR PREDICTION FOR VIDEO CODING

This application claims the benefit of U.S. Provisional Application Ser. No. 61/748,424, filed Jan. 2, 2013, the entire contents of which are hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for coding motion vectors using motion vector prediction in video coding. Video coding includes coding (e.g., encoding or decoding) individual blocks of a picture. Such blocks may be spatially predicted and coded, temporally predicted and coded, or inter-layer or inter-view predicted and coded. Temporal and inter-layer/inter-view prediction techniques may utilize a motion vector. In addition, video coders may be configured to code motion vectors. In accordance with the techniques of this disclosure, a video coder may be configured to determine a reference index of a candidate motion vector predictor for merge mode when performing temporal motion vector prediction (where the candidate motion vector predictor may refer to an inter-view reference picture), and also to determine a value for an additional reference index. The additional reference index may be substituted for the actual reference index of the candidate motion vector predictor, e.g., when performing merge mode coding of a motion vector for a block. Moreover, the value of the additional reference index may be set to a predetermined value, e.g., 0 or −1. In general, the additional reference index may refer to a long-term reference picture, such as an inter-view reference picture for a current picture including the block.

In one example, a method of coding video data includes determining a first target reference index representing a reference picture to which a candidate motion vector predictor for a current motion vector refers, determining, for the candidate motion vector predictor and during temporal motion vector prediction (TMVP) of the current motion vector, a value for an additional target reference index that is equal to a predetermined value, and coding the current motion vector based at least in part on the value of the additional reference index.

In another example, a device for coding video data includes a video coder configured to determine a first target reference index representing a reference picture to which a candidate motion vector predictor for a current motion vector refers, determine, for the candidate motion vector predictor and during temporal motion vector prediction (TMVP) of the current motion vector, a value for an additional target reference index that is equal to a predetermined value, and code the current motion vector based at least in part on the value of the additional reference index.

In another example, a device for coding video data includes means for determining a first target reference index representing a reference picture to which a candidate motion vector predictor for a current motion vector refers, means for determining, for the candidate motion vector predictor and during temporal motion vector prediction (TMVP) of the current motion vector, a value for an additional target reference index that is equal to a predetermined value, and means for coding the current motion vector based at least in part on the value of the additional reference index.

In another example, a computer-readable storage medium has stored thereon instructions that, when executed, cause a processor to determine a first target reference index representing a reference picture to which a candidate motion vector predictor for a current motion vector refers, determine, for the candidate motion vector predictor and during temporal motion vector prediction (TMVP) of the current motion vector, a value for an additional target reference index that is equal to a predetermined value, and code the current motion vector based at least in part on the value of the additional reference index.

The details of one or more examples are set forth in the accompanying drawings and the description below. Other features, objects, and advantages will be apparent from the description and drawings, and from the claims.

DETAILED DESCRIPTION

Figure 1:
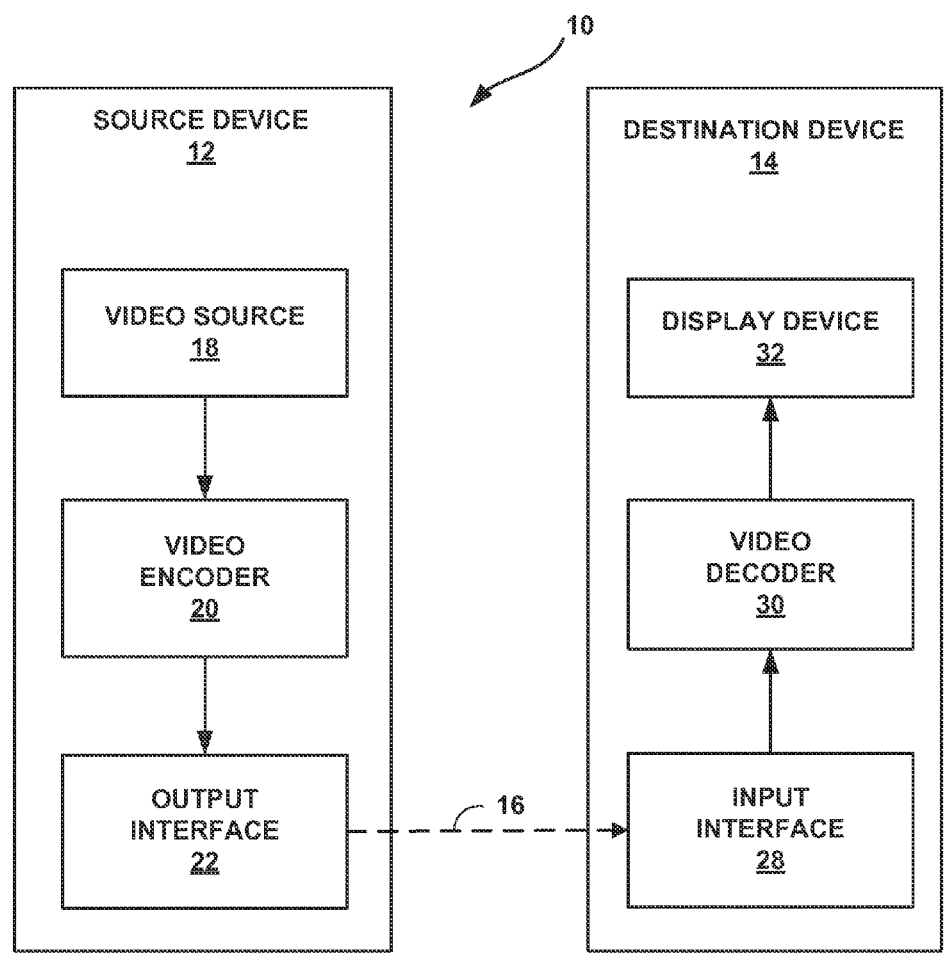
FIG. 1 is a block diagram illustrating an example video encoding and decoding system that may utilize techniques for coding motion vectors.

In general, this disclosure describes techniques that may improve temporal motion vector prediction for video encoder/decoder (codec) extensions, e.g., multiview or scalable extensions, while maintaining two-dimensional (2D) base layer/view decoding performance unchanged. A base video coding standard may comprise, for example, High Efficiency Video Coding (HEVC), and extensions to HEVC may include a multiview video coding extension to HEVC (e.g., MV-HEVC) and a scalable video coding extension to HEVC (e.g., SHVC).

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, there is an upcoming video coding standard, namely High-Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG). A Working Draft (WD) of HEVC, referred to as "HEVC WD9" or simply "WD9" hereinafter, is described in Bross et al., "High Efficiency Video Coding (HEVC) Text Specification Draft 9," 11$^{th}$ Meeting, Shanghai, Conn., 10-19 Oct. 2012, JCTVC-K1003_v13, which, as of Jan. 2, 2013, is available from http://phenix.int-evry.fr/jct/doc_end_user/documents/11_Shanghai/wg11/JCTVC-K1003-v13.zip.

This disclosure describes certain techniques as submitted in JCTVC-K0239 in greater detail below, with respect to FIGS. 5 and 6. It has been determined that the proposal of JCTVC-K0239 has room for improvement. For example, the derivation process of the additional reference index for temporal motion prediction of JCTVC-K0239 might cause some additional logic which is not necessary for 2D video coding. To support the solution as in JCTVC-K0239 with minimum changes in both HEVC and MV-HEVC, this disclosure describes various techniques.

For example, the additional reference index values for temporal motion vector prediction (TMVP), namely refIdxL0A and refIdxL1A, may be defined in HEVC base specification and always set to 0. Alternatively, refIdxL0A and/or refIdxL1A may be set to −1. RefIdxL0A represents an example of an index into reference picture list 0 (e.g., a list of reference pictures having display orders earlier than the current picture), while refIdxL1A represents an example of an index into reference picture list 1 (e.g., a list of reference pictures having display orders later than the current picture).

In addition, or in the alternative, the derivation process for the additional target reference index values for TMVP (refIdxL0A/refIdxL1A) may be defined only in MV-HEVC or other HEVC extensions. Alternatively, the additional target reference index values (refIdxL0A/refIdxL1A) may be signaled only in the slice header of MV-HEVC or other HEVC extensions, e.g., under the condition of layer_id (or viewIdx) not equal to 0, or as part of the slice header extension. Alternatively, the additional target reference index values (refIdxL0A/refIdxL1A) may be signaled in picture parameter set, sequence parameter set, or video parameter set of the HEVC specification or HEVC extensions. Alternatively, the additional target reference index values (refIdxL0A/refIdxL1A) may be signaled in slice header of HEVC base specification.

In addition, or in the alternative, when the additional target reference index value is signaled to be a value that is not equal to 0, it may correspond to a reference picture that has a different type than that of the reference picture identified by reference index 0. For example, refPicListX[0] and refPicListX[refIdxLXA] may be restricted so as not to both be short-term pictures and to not both be long-term pictures.

FIG. 1 is a block diagram illustrating an example video encoding and decoding system 10 that may utilize techniques for coding motion vectors. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablets, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet.

The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for coding motion vectors. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for coding motion vectors may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCUs) (also referred to as "coding tree units") that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In accordance with the techniques of this disclosure, video encoder 20 and video decoder 30 may be substantially configured to perform the techniques of JCTVC-K0239, with the following modifications. Compared to what is proposed in JCTVC-K0239, the following changes may be made.

Firstly, derivation of the additional target reference index as in entire section 2.1 of JCTVC-K0239 (including the contained subclause 8.3.5) may be removed, and the decoding process for reference picture list construction may be changed as follows (wherein italicized text represents additions and bracketed text preceded by "removed" represents removals).

8.3.4 Decoding Process for Reference Picture Lists Construction

This process is invoked at the beginning of the decoding process for each P or B slice.

Reference pictures are addressed through reference indices as specified in subclause 8.5.3.2.1. A reference index is an index into a reference picture list. When decoding a P slice, there is a single reference picture list RefPicList0. When decoding a B slice, there is a second independent reference picture list RefPicList1 in addition to RefPicList0.

At the beginning of the decoding process for each slice, the variable RefIdxL0A, and for B slices, RefIdxL1A, are set equal to 0, and the reference picture list RefPicList0, and for B slices RefPicList1, are derived as follows.

Secondly, all instances of "refIdxLXA" in the entire section 2.2 of JCTVC-K0239 (including all the contained subclauses) may be replaced with "RefIdxLXA."

Thirdly, a constraint may be inserted into the HEVC extension, stating that when RefIdxLXA is not equal to 0, RefPicListX[RefIdxLXA] and RefPicListX[0] shall have different types. For example, RefPicListX[RefIdxLXA] may be a long-term picture and RefPicListX[0] may be a short-term, or RefPicListX[RefIdxLXA] may be a short-term and RefPicListX[0] may be long-term.

To achieve these changes, video encoder 20 and video decoder 30 may be implemented according to the following high-level syntax changes, described with respect to HEVC WD9. Added text, relative to HEVC WD9, is represented using italicizing.

8.3.4. Decoding Process for Reference Picture Lists Construction

This process is invoked at the beginning of the decoding process for each P or B slice.

Reference pictures are addressed through reference indices as specified in subclause 8.5.3.2.1. A reference index is an index into a reference picture list. When decoding a P slice, there is a single reference picture list RefPicList0. When decoding a B slice, there is a second independent reference picture list RefPicList1 in addition to RefPicList0.

At the beginning of the decoding process for each slice, the variable RefIdxL0A, and for B slices, RefIdxL1A, are set equal to 0, and the reference picture list RefPicList0, and for B slices RefPicList1, are derived as follows.

Temporal motion vector prediction may be achieved using the following techniques, described with respect to HEVC WD9. Below, additions are represented by italicized text, while removals are represented by bracketed text preceded by "removed."

Changes for the invocation of TMVP for merge mode 8.5.2.1.1 Derivation Process for Luma Motion Vectors for Merge Mode This process is only invoked when PredMode[xC][yC] is equal to MODE_SKIP or PredMode[xC][yC] is equal to MODE_INTER and merge_flag [xP][yP] is equal to 1, where (xP, yP) specify the top-left sample of the current luma prediction block relative to the top-left luma sample of the current picture.

Inputs of this process are
a luma location (xC, yC) of the top-left sample of the current luma coding block relative to the top-left luma sample of the current picture,
a luma location (xP, yP) of the top-left sample of the current luma prediction block relative to the top-left luma sample of the current picture,
a variable nCS specifying the size of the current luma coding block,
variables specifying the width and the height of the luma prediction block, nPbW and nPbH,
a variable partIdx specifying the index of the current prediction unit within the current coding unit.

Outputs of this process are
the luma motion vectors mvL0 and mvL1,
the reference indices refIdxL0 and refIdxL1,
the prediction list utilization flags predFlagL0 and predFlagL1.

The variables singleMCLFlag is derived as follows.
If log 2_parallel_merge_level_minus2 is greater than 0 and nCS is equal to 8, singleMCLFlag is set to 1.
Otherwise, singleMCLFlag is set to 0.
When singleMCLFlag is equal to 1, xP is set equal to xC, yP is set equal to yC, and both nPbW and nPbH are set equal to nCS.

NOTE—When singleMCLFlag is equal to 1, all the prediction units of the current coding unit share a single merge candidate list, which is identical to the merge candidate list of the 2N×2N prediction unit.

The motion vectors mvL0 and mvL1, the reference indices refIdxL0 and refIdxL1, and the prediction utilization flags predFlagL0 and predFlagL1 are derived as specified by the following ordered steps:

1. The derivation process for merging candidates from neighboring prediction unit partitions in subclause . . . .
2. The reference index for temporal merging candidate refIdxLX (with X being 0 or 1) is set equal to 0.
3. The derivation process for temporal luma motion vector prediction in subclause 8.5.3.1.7 is invoked with luma location (xP, yP), the width and the height of the luma prediction block nPbW and nPbH, [removed: "and"] refIdxLX and mergeTMVP equal to 1 as the inputs and with the output being the availability flag availableFlagLXCol and the temporal motion vector mvLXCol. The variables availableFlagCol and predFlagLXCol (with X being 0 or 1, respectively) are derived as specified below.
4. ···
···

Changes for the invocation of TMVP for AMVP mode 8.5.3.1.5 Derivation Process for Luma Motion Vector Prediction Inputs to this process are
a luma location (xC, yC) of the top-left sample of the current luma coding block relative to the top-left luma sample of the current picture,
a variable nCS specifying the size of the current luma coding block,
a luma location (xP, yP) specifying the top-left sample of the current luma prediction block relative to the top-left luma sample of the current picture, variables specifying the width and the height of the luma prediction block, nPbW and nPbH, the reference index of the current prediction unit partition refIdxLX (with X being 0 or 1), a variable partIdx specifying the index of the current prediction unit within the current coding unit.

Output of this process is the prediction mvpLX of the motion vector mvLX (with X being 0 or 1).

The motion vector predictor mvpLX is derived in the following ordered steps.

1. The derivation process for motion vector predictor candidates from neighboring prediction unit partitions in subclause 8.5.3.1.6 is invoked with the luma coding block location (xC, yC), the coding block size nCS, the luma prediction block location (xP, yP), the width and the height of the luma prediction block nPbW and nPbH, refIdxLX (with X being 0 or 1, respectively), and the partition index partIdx as inputs and the availability flags availableFlagLXN and the motion vectors mvLXN with N being replaced by A, B as the output.

2. If both availableFlagLXA and availableFlagLXB are equal to 1 and mvLXA is not equal to mvLXB, availableFlagLXCol is set equal to 0, otherwise, the derivation process for temporal luma motion vector prediction in subclause 8.5.3.1.7 is invoked with luma location (xP, yP), the width and the height of the luma prediction block nPbW and nPbH, [removed: "and"] refIdxLX (with X being 0 or 1, respectively) and mergeTMVP equal to 0 as the inputs and with the output being the availability flag availableFlagLXCol and the temporal motion vector predictor mvLXCol.

...

Changes for TMVP derivation 8.5.3.1.7 Derivation Process for Temporal Luma Motion Vector Prediction Inputs to this process are a luma location (xP, yP) specifying the top-left sample of the current luma prediction block relative to the top-left luma sample of the current picture, variables specifying the width and the height of the luma prediction block, nPbW and nPbH, a variable mergeTMVP, a reference index refIdxLX (with X being 0 or 1).

Outputs of this process are the motion vector prediction mvLXCol, the availability flag availableFlagLXCol.

The variable currPb specifies the current luma prediction block at luma location (xP, yP).

The variables mvLXCol and availableFlagLXCol are derived as follows.

If slice_temporal_mvp_enable_flag is equal to 0, both components of mvLXCol are set equal to 0 and availableFlagLXCol is set equal to 0.

Otherwise, the following ordered steps apply.
1. Depending on the values of slice_type, collocated_from_l0_flag, and collocated_ref_idx, the variable colPic, specifying the picture that contains the collocated partition, is derived as follows.
    If slice_type is equal to B and collocated_from_l0_flag is equal to 0, the variable colPic specifies the picture that contains the collocated partition as specified by RefPicList1[collocated_ref_idx].
    Otherwise (slice_type is equal to B and collocated_from_l0_flag is equal to 1 or slice_type is equal to P), the variable colPic specifies the picture that contains the collocated partition as specified by RefPicList0[collocated_ref_idx].

2. The bottom right collocated motion vector is derived as follows $$xPRb=xP+nPbW \qquad (8\text{-}162)$$

$$yPRb=yP+nPbH \qquad (8\text{-}163)$$

If (yP>>Log 2CtbSizeY) is equal to (yPRb>>Log 2CtbSizeY), and xPRb is less than pic_width_in_luma_samples, the following applies.
    The variable colPb specifies the luma prediction block covering the modified location given by ((xPRb>>4)<<4, (yPRb>>4)<<4) inside the collocated picture specified by colPic.
    The luma location (xPCol, yPCol) is set equal to the top-left sample of the of the collocated luma prediction block specified by colPb relative to the top-left luma sample of the collocated picture specified by colPic.
    The derivation process for collocated motion vectors as specified in subclause 8.5.3.1.8 is invoked with currPb, colPic, colPb, (xPCol, yPCol), mergeTMVP, and refIdxLX as inputs and the output being assigned to mvLXCol and availableFlagLXCol.
Otherwise, both components of mvLXCol are set equal to 0 and availableFlagLXCol is set equal to 0.

3. When availableFlagLXCol is equal to 0, the central collocated motion vector is derived as follows.

$$xPCtr=xP+(nPbW>>1) \qquad (8\text{-}164)$$

$$yPCtr=yP+(nPbH>>1) \qquad (8\text{-}165)$$

The variable colPb specifies the luma prediction block covering the modified location given by ((xPCtr>>4)<<4, (yPCtr>>4)<<4) inside the colPic.

The luma location (xPCol, yPCol) is set equal to the top-left sample of the of the collocated luma prediction block specified by colPb relative to the top-left luma sample of the collocated picture specified by colPic.

The derivation process for collocated motion vectors as specified in subclause 8.5.3.1.8 is invoked with currPb, colPic, colPb, (xPCol, yPCol), mergeTMVP, and refIdxLX as inputs and the output being assigned to mvLXCol and availableFlagLXCol.

8.5.3.1.8 Derivation Process for Collocated Motion Vectors

Inputs to this process are currPb specifying the current prediction block, colPic specifying the collocated picture, colPb specifying the collocated prediction block inside the collocated picture specified by colPic, a luma location (xPCol, yPCol) specifying the top-left sample of the collocated luma prediction block specified by colPb relative to the top-left luma sample of the collocated picture specified by colPic, a variable mergeTMVP, a reference index refIdxLX (with X being 0 or 1).

Outputs of this process are the motion vector prediction mvLXCol, the availability flag availableFlagLXCol.

The variable currPic specifies the current picture.

The arrays predFlagLXCol[x][y], mvLXCol[x][y] and refIdxLXCol[x][y] are set equal to the corresponding arrays of the collocated picture specified by colPic, PredFlagLX[x][y], MvLX[x][y] and RefIdxLX[x][y], respectively with X being the value of X this process is invoked for.

The variables mvLXCol and availableFlagLXCol are derived as follows.

If colPb is coded in an intra prediction mode, both components of mvLXCol are set equal to 0 and availableFlagLXCol is set equal to 0.

Otherwise, the motion vector mvCol, the reference index refIdxCol, and the reference list identifier listCol are derived as follows.

If predFlagL0Col[xPCol][yPCol] is equal to 0, mvCol, refIdxCol, and listCol are set equal to mvL1Col[xPCol][yPCol], refIdxL1Col[xPCol][yPCol], and L1, respectively.

Otherwise if predFlagL0Col[xPCol][yPCol] is equal to 1 and predFlagL1Col[xPCol][yPCol] is equal to 0, mvCol, refIdxCol, and listCol are set equal to mvL0Col[xPCol][yPCol], refIdxL0Col[xPCol][yPCol], and L0, respectively.

Otherwise (predFlagL0Col[xPCol][yPCol] is equal to 1 and predFlagL1Col[xPCol][yPCol] is equal to 1), the following assignments are made.

If DiffPicOrderCnt(currPic, pic) is less than or equal to 0 for every picture pic in every reference picture list of the current slice, mvCol, refIdxCol, and listCol are set equal to mvLXCol[xPCol][yPCol], refIdxLXCol[xPCol][yPCol] and LX, respectively with X being the value of X this process is invoked for.

Otherwise, mvCol, refIdxCol and listCol are set equal to mvLNCol[xPCol][yPCol], refIdxLNCol[xPCol][yPCol] and LN, respectively with N being the value of collocated_from_10_flag.

and mvLXCol and availableFlagLXCol are derived as follows.

When [removed: "If"] LongTermRefPic(currPic, currPb, refIdxLX, LX) is not equal to LongTermRefPic(colPic, colPb, refIdxCol, listCol), the following applies If refIdxLXA is larger than 0, and mergeTMVP is equal to 1, refIdxLX is set to RefIdxLXA and availableFlagLXCol is set to 1.

Otherwise, both components of mvLXCol are set equal to 0 and availableFlagLXCol is set equal to 0.

[removed: "Otherwise,"] When the variable availableFlagLXCol is set equal to 1, refPicListCol[refIdxCol] is set to be the picture with reference index refIdxCol in the reference picture list listCol of the slice containing prediction block currPb in the picture colPic, and the following applies.

$$colPocDiff=DiffPicOrderCnt(colPic,refPicListCol[refIdxCol]) \quad (8\text{-}166)$$

$$currPocDiff=DiffPicOrderCnt(currPic,RefPicListX[refIdxLX]) \quad (8\text{-}167)$$

If RefPicListX[refIdxLX] is a long-term reference picture, or colPocDiff is equal to currPocDiff, mvLXCol is derived as:

$$mvLXCol=mvCol \quad (8\text{-}168)$$

Otherwise, mvLXCol is derived as scaled version of the motion vector mvCol as specified below.

$$tx=(16384+(Abs(td)>>1))/td \quad (8\text{-}169)$$

$$distScaleFactor=Clip3(-4096,4095,(tb*tx+32)>>6) \quad (8\text{-}170)$$

$$mvLXCol=Clip3(-32768,32767,Sign(distScaleFactor*mvCol)*((Abs(distScaleFactor*mvCol)+127)>>8)) \quad (8\text{-}171)$$

where td and tb are derived as $$td=Clip3(-128,127,colPocDiff) \quad (8\text{-}172)$$

$$tb=Clip3(-128,127,currPocDiff) \quad (8\text{-}173)$$

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
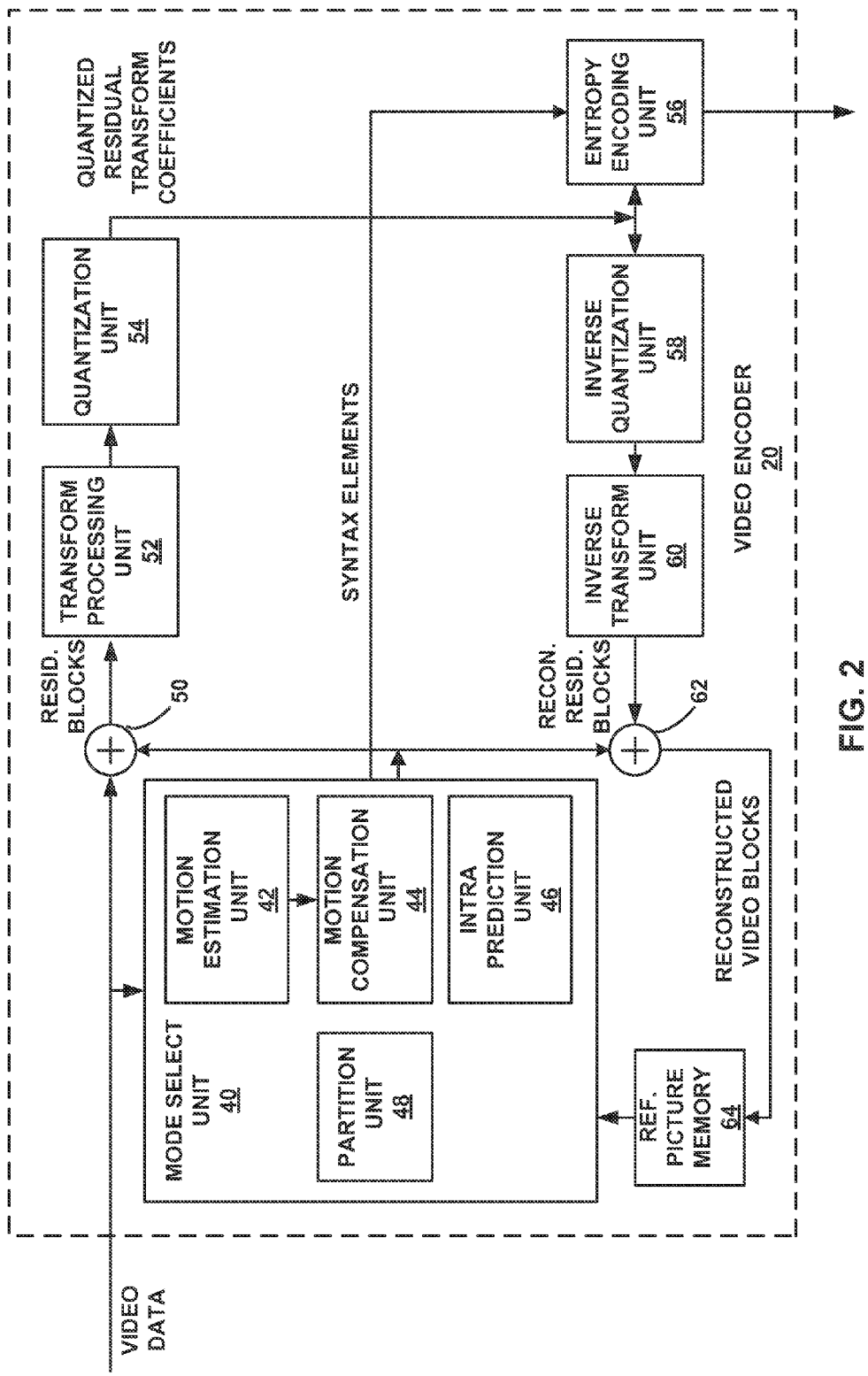
FIG. 2 is a block diagram illustrating an example of a video encoder that may implement techniques for coding motion vectors.

FIG. 2 is a block diagram illustrating an example of video encoder 20 that may implement techniques for coding motion vectors. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The quantization process may also be referred to as a "scaling" process, and thus, quantized transform coefficients may also be referred to as "scaled transform coefficients." The degree of quantization (or scaling) may be modified by adjusting a quantization parameter. In some examples, entropy encoding unit 56 may then perform a scan of the matrix including the quantized transform coefficients.

Following quantization, entropy encoding unit 56 entropy codes the scanned, quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

Mode select unit 40 may perform various encoding passes, as discussed above. In some of these passes, mode select unit 40 may determine a particular encoding mode for a current block of video data. For instance, mode select unit 40 may determine that the current block should be predicted using inter-prediction, based on resulting rate-distortion metrics from the passes. Likewise, mode select unit 40 may determine whether a motion vector for the current block should be encoded using advanced motion vector prediction (AMVP) or merge mode. In general, in AMVP, a motion vector is coded relative to a motion vector of an AMVP candidate, where motion vector differences are calculated between the current motion vector and the motion vector for the AMVP candidate. In addition, a reference picture list identifier and reference index are coded for the current motion vector as well.

In merge mode, on the other hand, nearly all of the motion parameters are inherited from a motion vector predictor, and only a motion vector predictor index is encoded to indicate which motion vector predictor in a set of candidate motion vector predictors is used to code the motion vector. However, in accordance with the techniques of this disclosure, video encoder 20 may use an additional reference index when performing merge mode.

Mode select unit 40 may determine that a current block should be inter-view predicted. Furthermore, mode select unit 40 may determine that a motion vector for a co-located block is sufficient for defining a motion vector that identifies a reference block of an inter-view reference picture for the current block. Thus, mode select unit 40 may elect to use merge mode to encode a motion vector for the current block, that is, merge mode using a temporal motion vector predictor (TMVP). However, in conventional merge mode, the motion vector for the current block would inherit a reference index of the co-located block, that is, the TMVP, which would refer to a reference picture having a different picture order count (POC) value than that of a current picture including the current block. Thus, to ensure that the inter-view reference picture has the same POC as that of the current picture, video encoder 20 may select the inter-view reference picture from the reference picture list using an additional reference index, which is separate from the reference index of the TMVP.

In particular, video encoder 20 may determine a predetermined value for the additional reference index. The predetermined value may be 0, −1, or another value. Video encoder 20 may, in some examples, encode data representative of the predetermined value in a slice header of a slice including the current block, a picture parameter set (PPS) for a picture including the current block, a sequence parameter set (SPS) for a sequence including the picture, and/or a video parameter set (VPS). Entropy encoding unit 56 may entropy encode this data. In any case, by using the additional reference index, video encoder 20 may ensure that the inter-view reference picture for the current block of the current picture has the same POC value as the POC value for the current picture.

Accordingly, when motion compensation unit 44 constructs a predicted block for the current block, motion compensation unit 44 may use the horizontal motion component, vertical motion component, and reference picture list from a co-located block in a different picture, but the predetermined value for an additional reference index, to determine the location of a reference block in a reference picture, then calculate the predicted block from the reference block. The reference picture may correspond to a reference picture identified by the additional reference index applied to the reference picture list, while the reference block may be identified at a location in the reference picture defined by the location of the current block offset by the horizontal motion component and vertical motion component of the TMVP.

In this manner, video encoder 20 represents an example of a video encoder configured to determine a first target reference index representing a reference picture to which a candidate motion vector predictor for a current motion vector refers, determine, for the candidate motion vector predictor and during temporal motion vector prediction (TMVP) of the current motion vector, a value for an additional target reference index that is equal to a predetermined value, and code (i.e., encode in this example) the current motion vector based at least in part on the value of the additional reference index.

Video encoder 20 of FIG. 2 also represents an example of a video encoder that may be configured to set a value for an additional reference index to a predetermined value during temporal motion vector prediction (TMVP) of a current motion vector, and code the current motion vector based at least in part on the value of the additional reference index. Additionally or alternatively, video encoder 20 may be configured to determine whether video data to be coded conforms to a base video coding standard or an extension of the base video coding standard; when the video data conforms to the base video coding standard, code the video data in accordance with the base video coding standard; and when the video data conforms to the extension of the base video coding standard, when coding a motion vector for a block of a picture of the video data, derive a value for an additional target reference index value for temporal motion vector prediction (TMVP) of the motion vector, and code the motion vector based at least in part on the value of the additional target reference index value.

Figure 3:
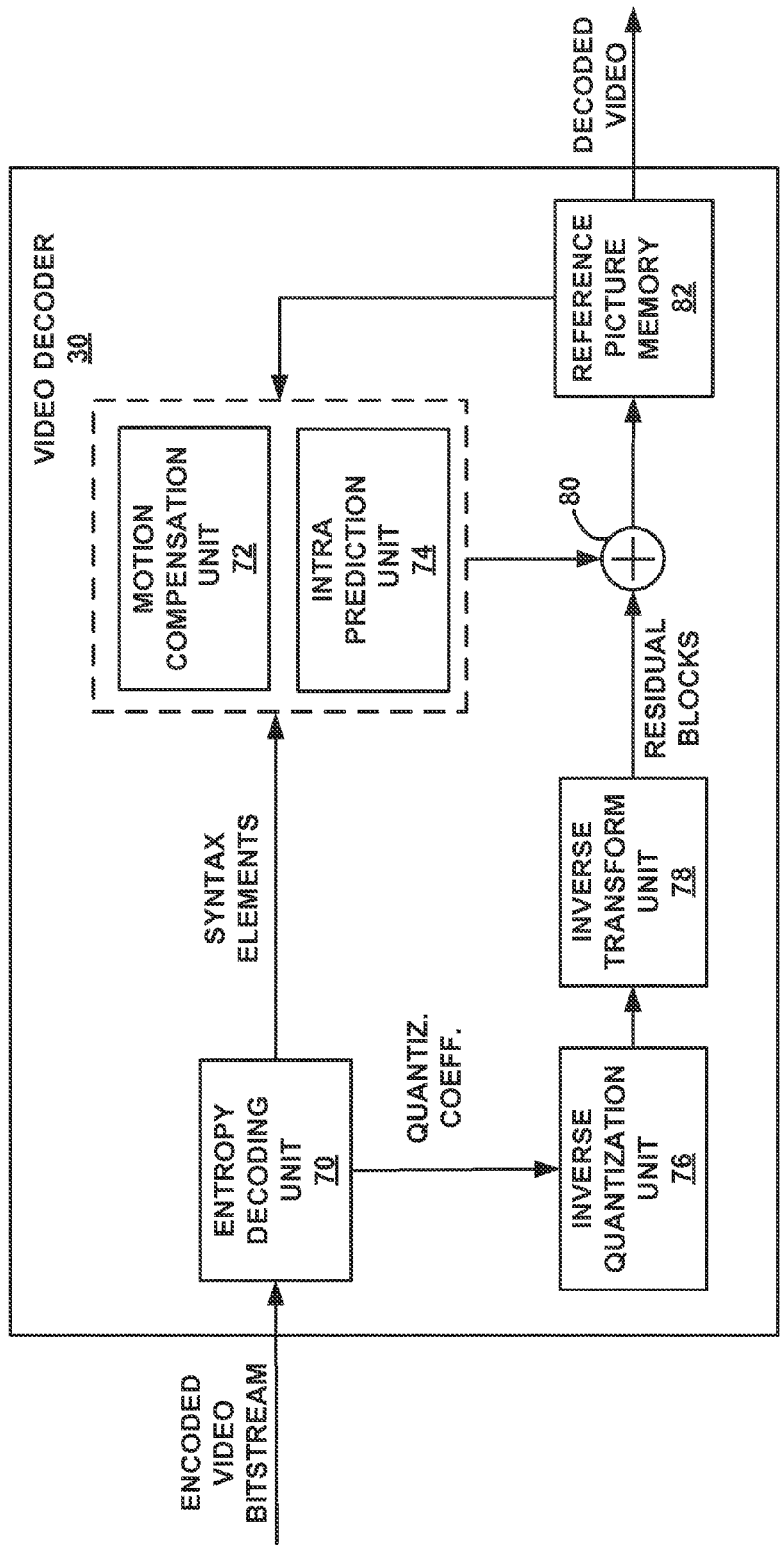
FIG. 3 is a block diagram illustrating an example of a video decoder that may implement techniques for coding motion vectors.

FIG. 3 is a block diagram illustrating an example of video decoder 30 that may implement techniques for coding motion vectors. In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

In accordance with the techniques of this disclosure, video decoder 30 may receive data indicating that a current block is to be decoded using inter-prediction. Furthermore, the data may indicate that a motion vector for the current block is to be decoded using merge mode, and that a temporal motion vector predictor (TMVP) is available for use during merge mode. Moreover, video decoder 30 may determine a predetermined value to be used for additional reference indexes. For example, the predetermined value may be defined in a slice header of a slice including the current block, a picture parameter set (PPS) for a picture including the current block, a sequence parameter set (SPS) for a sequence including the picture, and/or a video parameter set (VPS).

In some examples, video decoder 30 may decode a motion vector predictor (MVP) index that indicates that a merge candidate for the current block is a motion vector of a co-located block, i.e., a TMVP. Video decoder 30 may therefore determine motion parameters for the TMVP, such as a reference index, a reference picture list, a horizontal motion component, and a vertical motion component. However, video decoder 30 may also determine an additional reference index, having the predetermined value as discussed above.

Entropy decoding unit 70, or another unit of video decoder 30 (e.g., motion compensation unit 72), may construct a motion vector for the current block using merge mode and the TMVP. In particular, video decoder 30 may construct the motion vector for the current block to have the horizontal motion component, vertical motion component, and reference picture list identifier of the TMVP. However, rather than the reference index of the TMVP, the motion vector for the current block may use the additional reference index. Thus, motion compensation unit 72 may calculate a predicted block for the current block using a reference picture identified by the reference picture list of the TMVP and the additional reference index, and a position of a reference block in the reference picture based on the horizontal motion component and the vertical motion component.

In this manner, video decoder 30 represents an example of a video decoder configured to determine a first target reference index representing a reference picture to which a candidate motion vector predictor for a current motion vector refers, determine, for the candidate motion vector predictor and during temporal motion vector prediction (TMVP) of the current motion vector, a value for an additional target reference index that is equal to a predetermined value, and code (i.e., decode in this example) the current motion vector based at least in part on the value of the additional reference index.

Video decoder 30 of FIG. 3 also represents an example of a video decoder that may be configured to set a value for an additional reference index to a predetermined value during temporal motion vector prediction (TMVP) of a current motion vector, and code the current motion vector based at least in part on the value of the additional reference index. Additionally or alternatively, video decoder 30 may be configured to determine whether video data to be coded conforms to a base video coding standard or an extension of the base video coding standard; when the video data conforms to the base video coding standard, code the video data in accordance with the base video coding standard; and when the video data conforms to the extension of the base video coding standard, when coding a motion vector for a block of a picture of the video data, derive a value for an additional target reference index value for temporal motion vector prediction (TMVP) of the motion vector, and code the motion vector based at least in part on the value of the additional target reference index value.

Figure 4:
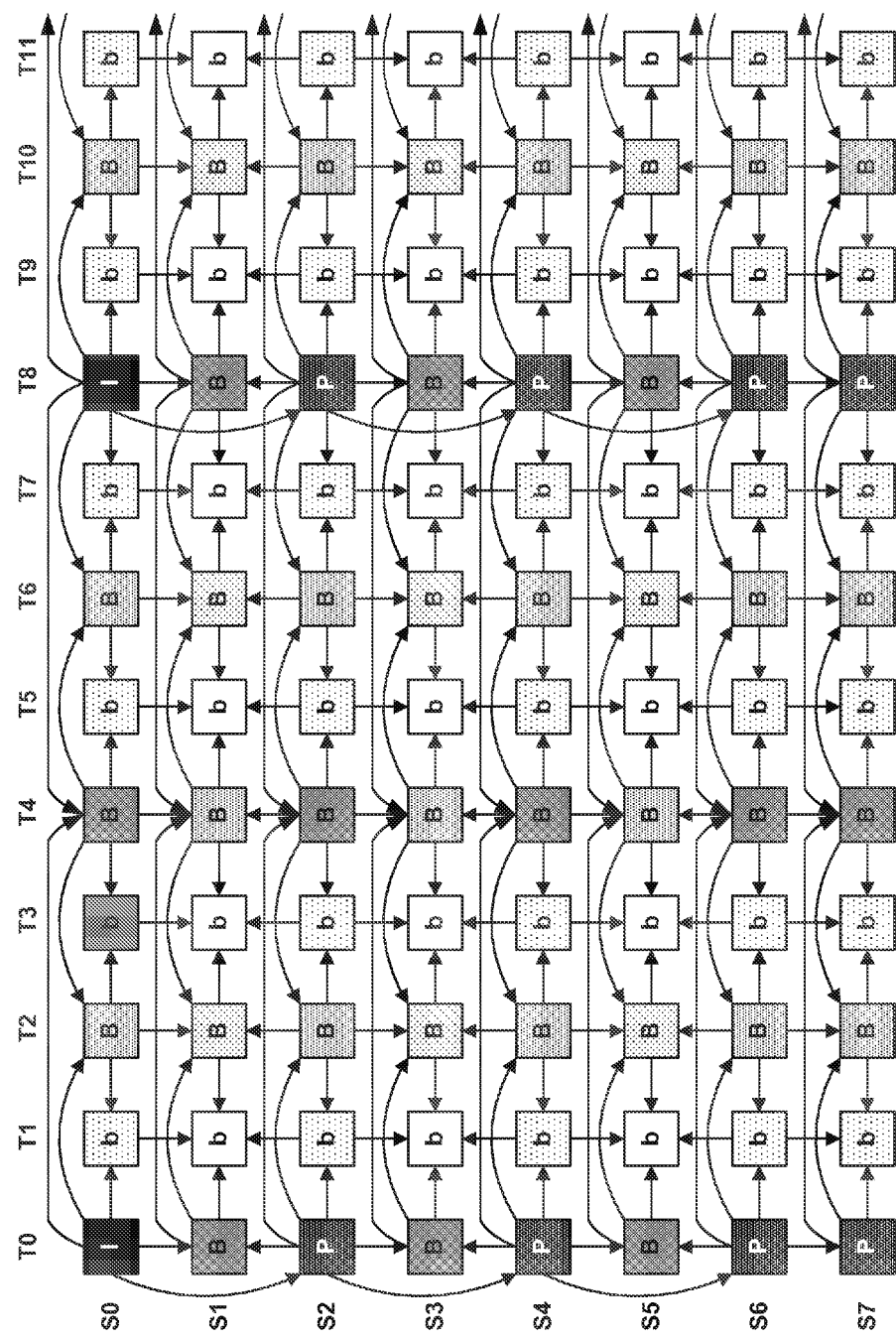
FIG. 4 is a conceptual diagram illustrating an example multiview video coding (MVC) prediction pattern.

FIG. 4 is a conceptual diagram illustrating an example MVC prediction pattern. Multi-view video coding (MVC) is an extension of ITU-T H.264/AVC. A similar technique may be applied to HEVC. In the example of FIG. 4, eight views (having view IDs "S0" through "S7") are illustrated, and twelve temporal locations ("T0" through "T11") are illustrated for each view. That is, each row in FIG. 4 corresponds to a view, while each column indicates a temporal location. FIG. 4 illustrates a typical MVC prediction structure for multi-view video coding, including both inter-picture prediction within each view and inter-view prediction between views.

Although MVC has a so-called base view which is decodable by H.264/AVC decoders and stereo view pair could be supported also by MVC, one advantage of MVC is that it could support an example that uses more than two views as a 3D video input and decodes this 3D video represented by the multiple views. A renderer of a client having an MVC decoder may expect 3D video content with multiple views.

A typical MVC decoding order arrangement is referred to as time-first coding. An access unit may include coded pictures of all views for one output time instance. For example, each of the pictures of time T0 may be included in a common access unit, each of the pictures of time T1 may be included in a second, common access unit, and so on. The decoding order is not necessarily identical to the output or display order. In MVC, inter-view prediction is allowed among pictures in the same access unit (i.e., having the same time instance). When coding a picture in one of the non-base views, a picture may be added into a reference picture list, if it is in a different view but with a same time instance. An inter-view prediction reference picture can be put in any position of a reference picture list, just like any inter prediction reference picture.

Frames in FIG. 4 are indicated at the intersection of each row and each column in FIG. 4 using a shaded block including a letter, designating whether the corresponding frame is intra-coded (that is, an I-frame), or inter-coded in one direction (that is, as a P-frame) or in multiple directions (that is, as a B-frame). In general, predictions are indicated by arrows, where the pointed-to frame uses the pointed-from object for prediction reference. For example, the P-frame of view S2 at temporal location T0 is predicted from the I-frame of view S0 at temporal location T0.

As with single view video encoding, frames of a multi-view video coding video sequence may be predictively encoded with respect to frames at different temporal locations. For example, the b-frame of view S0 at temporal location T1 has an arrow pointed to it from the I-frame of view S0 at temporal location T0, indicating that the b-frame is predicted from the I-frame. Additionally, however, in the context of multiview video encoding, frames may be inter-view predicted. That is, a view component can use the view components in other views for reference. In MVC, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references.

In the MVC extension of H.264/AVC, as an example, inter-view prediction is supported by disparity motion compensation, which uses the syntax of the H.264/AVC motion compensation, but allows a picture in a different view to be used as a reference picture. Coding of two views can be supported by MVC, which is generally referred to as stereoscopic views. One of the advantages of MVC is that an MVC encoder could take more than two views as a 3D video input and an MVC decoder can decode such a multiview representation. So a rendering device with an MVC decoder may expect 3D video contents with more than two views.

Typically, a reference picture list construction for the first or the second reference picture list of a B picture includes two steps: reference picture list initialization and reference picture list reordering (modification). The reference picture list initialization is an explicit mechanism according to which a video coder places the reference pictures in the reference picture memory (also known as a decoded picture buffer) into a list based on the order of POC (Picture Order Count, aligned with display order of a picture) values.

The video coder may use the reference picture list reordering mechanism to modify the position of a picture that was put in the list during the reference picture list initialization to any new position, or put any reference picture in the reference picture memory in any position even the picture doesn't belong to the initialized list. Some pictures after the reference picture list reordering (modification) may be put in a further position in the list. However, if a position of a picture exceeds the number of active reference pictures of the list, the picture is not considered as an entry of the final reference picture list. The number of active reference pictures of may be signaled in the slice header for each list. After reference picture lists are constructed (e.g., RefPicList0 and RefPicList1, if available), a reference index to a reference picture list can be used to identify any reference picture included in the reference picture list.

To get a Temporal Motion Vector Predictor (TMVP), firstly a co-located picture is to be identified. If the current picture is a B slice, a collocated_from_l0_flag is signalled in slice header to indicate whether the co-located picture is from RefPicList0 or RefPicList1. After a reference picture list is identified, collocated_ref_idx, signalled in slice header is used to identify the picture in the picture in the list. A co-located PU is then identified by checking the co-located picture. Either the motion of the right-bottom PU of the CU containing this PU, or the motion of the right-bottom PU within the center PUs of the CU containing this PU is used. When motion vectors identified by the above process are used to generate a motion candidate for AMVP or merge mode, they need to be scaled based on the temporal location (reflected by POC).

In HEVC, the sequence parameter set (SPS) includes a flag sps_temporal_mvp_enable_flag and the slice header includes a flag pic_temporal_mvp_enable_flag when sps_temporal_mvp_enable_flag is equal to 1. When both pic_temporal_mvp_enable_flag and temporal_id are equal to 0 for a particular picture, no motion vector from pictures before that particular picture in decoding order would be used as a temporal motion vector predictor in decoding of the particular picture or a picture after the particular picture in decoding order.

Currently, the Moving Pictures Experts Group (MPEG) is developing a 3DV standard based on HEVC, for which part of the standardization efforts also includes the standardization of the multiview video codec based on HEVC. Note that similarly, in HEVC based 3DV, inter-view prediction based on the reconstructed view components from different views is enabled.

AVC was extended by a multiview extension in a way that the extension actually fulfills the "HLS-only" (high-level syntax only) requirement. The "HLS-only" requirement guarantees there is only high-level syntax (HLS) changes in the Multiview Video Coding (MVC), such that no module in the macroblock level in AVC needs to be re-designed and can be fully reused for MVC. It is possible that the "HLS-only" requirement may be fulfilled for an MVC/3DV extension of HEVC, and also for Scalable Video Coding (SVC) extension of HEVC, if multi-loop decoding is considered as acceptable.

To enable inter-view prediction, HLS changes may be made are for the following purpose: picture identification—reference picture list construction and marking need to be able to identify a picture in a specific view.

The HLS changes are not sufficient to fulfill the "HLS-only" requirement in H.264/MVC, as other constraints, assumptions are made, so that the low-level coding modules will never encounter a situation of, e.g., handling zero motion related scaling. Such constraints, modifications, and assumptions are:

Disabling temporal direct mode if a co-located picture is an inter-view (only) reference picture
Considering an inter-view (only) reference picture as not a short-term: related to spatial direct
Disabling implicit weighted prediction To fulfil the "HLS-only" requirement, such modifications in an extension must only be in the high-level syntax. Thus, there should be no modifications for syntax elements under slice header, and no CU level decoding process changes for the extension specification; for example, the motion vector prediction of the HEVC extension specification, should be exactly the same as that in the HEVC base specification. The HLS changes are normative decoder changes of the extension specification; however, from the base specification point of view, such changes do not necessarily need to be known and can be informative.

To enable functionalities such as efficient inter-view prediction, both modifications in the HEVC extension and base specifications may be implemented. The base specification changes that do not impact the typical decoding processes or coding efficiency of the base HEVC decoders, but target enabling functionalities in the extension specification, are called hooks. In most cases, a "HLS-only" requirement is fulfilled with both hooks in base specification and HLS changes in the extension specification. If the hooks in base specifications are not defined well, certain desired functionality might not be enabled in the extension specification or needs a lot of modifications in the extension specification.

In HLS-only SVC, a base layer representation, possibly after upsampling and/or filtering, may be put into the reference picture list of the current picture of the current layer. Such a picture is called an inter-layer reference picture.

The HEVC extensions are under development in JCT-3V and JCT-VC. In JCT-3V, two HEVC extensions, the multi-view extension (MV-HEVC) and 3D video extension (3D-HEVC) are being developed. In addition, two AVC extensions, the MVC+D and 3D-AVC are being developed. Example descriptions of the ongoing standards include JCT3V-B1001, "Study Text of ISO/IEC 14496-10:2012/DAM2 MVC extension for inclusion of depth maps," M. Hannuksela (Nokia), Y. Chen (Qualcomm), G. Sullivan (Microsoft), T. Suzuki, S. Hattori (Sony), available at http://phenix.it-sudparis.eu/jct2/doc_end_user/documents/2_Shanghai/wg11/JCT3V-B1001-v1.zip; JCT3V-B1002, "3D-AVC draft text 4," M. M. Hannuksela, Y. Chen, T. Suzuki, J.-R. Ohm, G. J. Sullivan, available at http://phenix.it-sudparis.eu/jct2/doc_end_user/documents/2_Shanghai/wg11/JCT3V-B1002-v1.zip; JCT3V-B1004, "MV-HEVC Draft Text 2," G. Tech, K. Wegner, Y. Chen, M. Hannuksela, available at http://phenix.it-sudparis.eu/jct2/doc_end_user/documents/2_Shanghai/wg11/JCT3V-B1004-v1.zip; and JCT3V-B1005, "3D-HEVC Test Model 2," G. Tech, K. Wegner, Y. Chen, S. Yea, http://phenix.it-sudparis.eu/jct2/doc_end_user/documents/2_Shanghai/wg11/JCT3V-B1005-v1.zip. Meanwhile, the scalable extension of HEVC is being developed by JCT-VC.

In various versions of the coding extensions standards, multiple views or layers may be present, furthermore, different layers, texture or depth views may have different spatial resolutions. In general, where this document refers to a "layer," the term layer may be equally applicable to either a layer of SVC or a view of MVC. That is, a different view may be considered a different "layer" of the bitstream. The MV HEV specification is designed to be achieved using HLS changes only.

Figure 5:
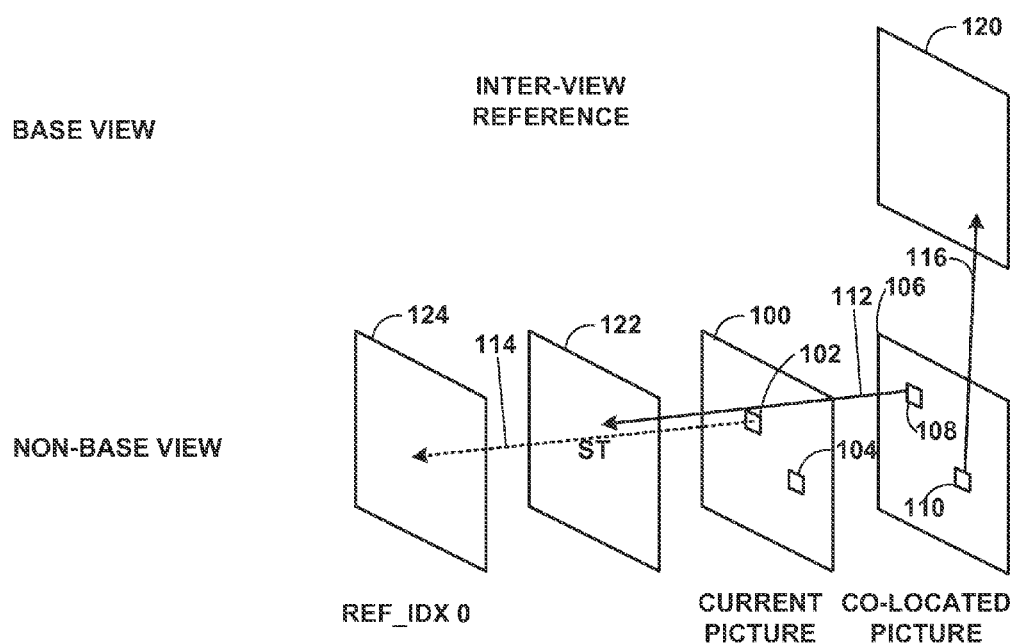
FIG. 5 is a conceptual diagram illustrating an example set of pictures and motion vectors used to code blocks of the pictures.

FIG. 5 is a conceptual diagram illustrating an example set of pictures and motion vectors used to code blocks of the pictures. The example of FIG. 5 illustrates current picture 100, co-located picture 106, short-term (ST) reference picture 122, and reference picture 124, having a reference index of 0 when placed in a reference picture list for current picture 100. Each of pictures 100, 106, 122, and 124 occur within the same view, namely, a non-base view, in this example. FIG. 5 also depicts inter-view reference picture 120, occurring within a base view that is distinct from the non-base view.

In this example, current picture 100 includes blocks 102, 104. Block 102 is predicted relative to picture 124 using temporal motion vector 114. In this example, co-located picture 106 includes blocks 108, 110. Likewise, in this example, block 108 is temporally predicted relative to short-term reference picture 122 using temporal motion vector 112, while block 110 is inter-view predicted relative to inter-view reference picture 120 using disparity motion vector 116.

A video coder, such as video encoder 20 or video decoder 30, may code motion vector 114 using motion vector prediction. Motion vector prediction modes include merge mode and advanced motion vector prediction (AMVP). WD9 specifies that, when the motion vector prediction mode is merge mode, the target reference index is to be set to 0. Thus, the motion vector in the co-located PU, if referring to a short-term reference picture, is scaled to form a merge candidate of the current PU. In the example of FIG. 5, to code temporal motion vector 114, a video coder would scale temporal motion vector 112 to form a merge candidate for temporal motion vector 114, where block 102 represents a current PU.

However, WD9 also specifies that, if the co-located PU has a motion vector referring to a long-term reference picture (corresponding to an inter-view reference picture), the motion vector referring to the inter-view reference picture is not to be used to predict the current motion vector. For example, in FIG. 5, WD9 would specify that disparity motion vector 116 of block 110 would not be used to code a motion vector of block 104 (FIG. 5 does not show this motion vector).

In MV-HEVC, the temporal motion vector prediction process is the same as in HEVC, due to the fact that no modifications in the coding unit or lower level can be introduced. However, there might be a significant amount of co-located PUs (in the co-located picture) which contain motion vectors referring to an inter-view reference picture while the target reference index (being equal to 0) indicates a short-term reference picture. Therefore, disabling prediction from those motion vectors, as specified by WD9, makes the merge mode less efficient.

Figure 6:
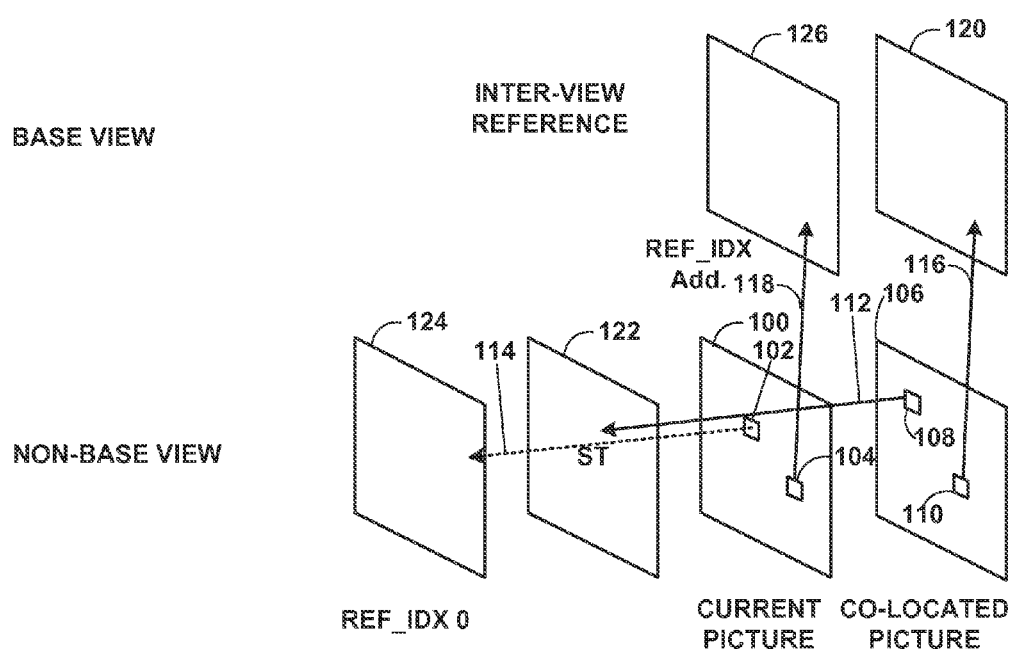
FIG. 6 is a conceptual diagram illustrating another example set of pictures and motion vectors used to code blocks of the pictures.

FIG. 6 is a conceptual diagram illustrating another example set of pictures and motion vectors used to code blocks of the pictures. In particular, FIG. 6 illustrates a proposal from Chen et al., "Temporal Motion Vector Prediction Hook for MV-HEVC," JCTVC-K0239, Shanghai, China, 10-19 October, 2012, available at http://phenix.int-evry.fr/jct/doc_end_user/documents/11_Shanghai/wg11/JCTVC-K0239-v2.zip. This document is also appended, in part, as Appendix A to this disclosure. In JCTVC-K0239, it is proposed that an additional target reference index is enabled. With respect to the example of FIG. 5, motion vectors referring to short-term reference pictures may still be scaled towards the reference picture with reference index equal to 0, as in HEVC WD9.

However, for long-term reference pictures, video coders (e.g., video encoder 20 and video decoder 30) may derive a new additional reference index (ref_idx Add.), so that the motion vectors referring to a long-term reference picture can be used to form a merge candidate and not considered as unavailable. As shown in FIG. 6, disparity motion vector 116 of co-located block 110 to block 104 of the current picture can be used to form a disparity motion vector candidate, for predicting disparity motion vector 118. In accordance with the techniques of this disclosure, the value of the additional reference index may be predetermined, e.g., by an applicable video coding standard (e.g., HEVC), an extension to such a standard (e.g., multiview video coding or scalable video coding), or by a video encoder, such as video encoder 20

(FIGS. 1 and 2). In some examples, a video encoder may encode the predetermined value, e.g., in a slice header, a PPS, an SPS, and/or a VPS.

In general, when the reference index equal to 0 represents a short-term reference picture, the newly added target reference index may be used to represent a long-term reference picture. When the reference index equal to 0 represents a long-term reference picture, the newly added target reference index may be used to represent a short-term reference picture. Thus, video coders (e.g., video encoder 20 and video decoder 30) may be configured to determine that, when the reference index equal to 0 represents a short-term reference picture, the newly added target reference index represents a long-term reference picture, and vice versa.

Similar to HEVC WD9, if the target reference index corresponds to a long-term reference picture, the motion vector in a co-located block, if considered as available, need not be scaled.

The following syntax and semantics have been proposed for the HEVC base specification, as a high level syntax change, as a technique for deriving an additional target reference index. In the slice level, the value of the additional target reference index (refIdxLXA) for each of RefPicList0 and RefPicList1, if available, may be derived.

8.3.5 Derivation Process for the Additional Target Reference Index for TMVP

This process is invoked when the current slice is a P or B slice. Additional target reference indices refIdxL0A and refIdxL1A are derived.

Set variables refIdxL0A and refIdxL1A both to −1.
The following apply to derive refIdxL0A.

```
bZeroIdxLongTermFlag = RefPicList0[ 0 ] is a short-term reference
picture ? 0 : 1
bFound = 0
for( i = 1; i <= num_ref_idx_l0_active_minus1&&! bFound; i++)
  if ( (bZeroIdxLongTermFlag && RefPicList0[ i ] is a short-term
    reference picture) || (!bZeroIdxLongTermFlag && RefPicList0[ i ] is
    a long-term reference picture) ) {
      refIdxL0A = i
      bFound =1
  }
```

When the slice is a B slice, the following apply to derive refIdxL1A.

```
bZeroIdxLongTermFlag = RefPicList1[ 0 ] is a short-term reference
picture ? 0 : 1
bFound = 0
for( i = 1; i <= num_ref_idx_l1_active_minus1&&! bFound; i++)
  if ( (bZeroIdxLongTermFlag && RefPicList1[ i ] is a short-term
    reference picture) || (!bZeroIdxLongTermFlag && RefPicList1[ i ] is
    a long-term reference picture) ) {
      refIdxL1A = i
      bFound =1
  }
```

Section 8.3.5 of HEVC as proposed by JCTVC-K0239 and discussed above is presented for purposes of comparison. In accordance with the techniques of this disclosure, certain general techniques of JCTVC-K0239, such as the use of an additional reference index for merge mode, may be used, but Section 8.3.5 may be omitted. Instead of Section 8.3.5, in accordance with the techniques of this disclosure, the additional reference index may be set to a predetermined value, e.g., 0, −1, or another predetermined value. Thus, the techniques of this disclosure may achieve an appreciable benefit over JCTVC-K0239, in that complexity may be reduced such that processing efficiency may be improved.

Thus, instead of using Section 8.3.5 as proposed by JCTVC-K0239 to determine values for the additional reference index, e.g., RefIdxL0A (and for B slices, RefIdxL1A), this disclosure proposes setting variables RefIdxL0a and RefIdxL1A equal to a predetermined value (e.g., 0 or −1). The reference picture lists (RefPicListX, where X may be equal to 0 or 1) may be derived normally, e.g., according to HEVC, MV-HEVC, JCTVC-K0239, or otherwise.

Below, a technique for performing temporal motion vector prediction is described. During temporal motion vector prediction, when the current mode is merge, the target reference index 0 may be changed to refIdxLXA (with X being equal to 0 or 1). The AMVP mode is not changed. The proposed specification text changes are as follows, with newly added/modified text italicized and deleted text bracketed and preceded by "removed."

Changes for the invocation of TMVP for merge mode
8.5.2.1.1 Derivation Process for Luma Motion Vectors for Merge Mode This process is only invoked when PredMode[xC][yC] is equal to MODE_SKIP or PredMode[xC][yC] is equal to MODE_INTER and merge_flag [xP][yP] is equal to 1, where (xP, yP) specify the top-left sample of the current luma prediction block relative to the top-left luma sample of the current picture.

Inputs of this process are
a luma location (xC, yC) of the top-left sample of the current luma coding block relative to the top-left luma sample of the current picture,
a luma location (xP, yP) of the top-left sample of the current luma prediction block relative to the top-left luma sample of the current picture,
a variable nCS specifying the size of the current luma coding block,
variables specifying the width and the height of the luma prediction block, nPbW and nPbH,
a variable partIdx specifying the index of the current prediction unit within the current coding unit.

Outputs of this process are
the luma motion vectors mvL0 and mvL1,
the reference indices refIdxL0 and refIdxL1,
the prediction list utilization flags predFlagL0 and predFlagL1.

The variables singleMCLFlag is derived as follows.
If log 2_parallel_merge_level_minus2 is greater than 0 and nCS is equal to 8, singleMCLFlag is set to 1.
Otherwise, singleMCLFlag is set to 0.
When singleMCLFlag is equal to 1, xP is set equal to xC, yP is set equal to yC, and both nPbW and nPbH are set equal to nCS.

NOTE—When singleMCLFlag is equal to 1, all the prediction units of the current coding unit share a single merge candidate list, which is identical to the merge candidate list of the 2N×2N prediction unit.

The motion vectors mvL0 and mvL1, the reference indices refIdxL0 and refIdxL1, and the prediction utilization flags predFlagL0 and predFlagL1 are derived as specified by the following ordered steps:
1. The derivation process for merging candidates from neighboring prediction unit partitions in subclause . . . .
2. The reference index for temporal merging candidate refIdxLX (with X being 0 or 1) is set equal to 0.
3. The derivation process for temporal luma motion vector prediction in subclause 8.5.3.1.7 is invoked with luma location (xP, yP), the width and the height of the luma prediction block nPbW and nPbH, [removed: "and"] refIdxLX and mergeTMVP equal to 1 as the inputs and with the output being the availability flag availableFlagLXCol and the temporal motion vector mvLXCol. The variables availableFlagCol and predFlagLXCol (with X being 0 or 1, respectively) are derived as specified below.
4. ...
   ...

Changes for the invocation of TMVP for AMVP mode
8.5.3.1.5 Derivation Process for Luma Motion Vector Prediction Inputs to this process are
a luma location (xC, yC) of the top-left sample of the current luma coding block relative to the top-left luma sample of the current picture,
a variable nCS specifying the size of the current luma coding block,
a luma location (xP, yP) specifying the top-left sample of the current luma prediction block relative to the top-left luma sample of the current picture,
variables specifying the width and the height of the luma prediction block, nPbW and nPbH,
the reference index of the current prediction unit partition refIdxLX (with X being 0 or 1),
a variable partIdx specifying the index of the current prediction unit within the current coding unit.

Output of this process is
the prediction mvpLX of the motion vector mvLX (with X being 0 or 1).

The motion vector predictor mvpLX is derived in the following ordered steps.
3. The derivation process for motion vector predictor candidates from neighboring prediction unit partitions in subclause 8.5.3.1.6 is invoked with the luma coding block location (xC, yC), the coding block size nCS, the luma prediction block location (xP, yP), the width and the height of the luma prediction block nPbW and nPbH, refIdxLX (with X being 0 or 1, respectively), and the partition index partIdx as inputs and the availability flags availableFlagLXN and the motion vectors mvLXN with N being replaced by A, B as the output.
4. If both availableFlagLXA and availableFlagLXB are equal to 1 and mvLXA is not equal to mvLXB, availableFlagLXCol is set equal to 0, otherwise, the derivation process for temporal luma motion vector prediction in subclause 8.5.3.1.7 is invoked with luma location (xP, yP), the width and the height of the luma prediction block nPbW and nPbH, [removed: "and"] refIdxLX (with X being 0 or 1, respectively) and mergeTMVP equal to 0 as the inputs and with the output being the availability flag availableFlagLXCol and the temporal motion vector predictor mvLXCol.
   ...

Changes for TMVP
8.5.3.1.7 Derivation Process for Temporal Luma Motion Vector Prediction Inputs to this process are
a luma location (xP, yP) specifying the top-left sample of the current luma prediction block relative to the top-left luma sample of the current picture,
variables specifying the width and the height of the luma prediction block, nPbW and nPbH,
a reference index refIdxLX (with X being 0 or 1) [removed: "."],
a variable mergeTMVP.

Outputs of this process are the motion vector prediction mvLXCol, the availability flag availableFlagLXCol.

The function RefPicOrderCnt(picX, refIdx, LX) returns the picture order count PicOrderCntVal of the reference picture with index refIdx from reference picture list LX of the picture picX and is specified as follows.

$$RefPicOrderCnt(picX, refIdx, LX) = PicOrderCnt(RefPicListX[refIdx] \text{ of the picture } picX) \quad (8\ 141)$$

Depending on the values of slice_type, collocated_from_l0_flag, and collocated_ref_idx, the variable colPic, specifying the picture that contains the collocated partition, is derived as follows.

If slice_type is equal to B and collocated_from_l0_flag is equal to 0, the variable colPic specifies the picture that contains the collocated partition as specified by RefPicList1[collocated_ref_idx].

Otherwise (slice_type is equal to B and collocated_from_l0_flag is equal to 1 or slice_type is equal to P), the variable colPic specifies the picture that contains the collocated partition as specified by RefPicList0[collocated_ref_idx].

Variable colPb and its position (xPCol, yPCol) are derived in the following ordered steps:

1. The variable colPb is derived as follows $$yPRb = yP + nPbH \quad (2\text{-}1)$$

If (yP>>Log 2CtbSizeY) is equal to (yPRb>>Log 2CtbSizeY), the horizontal component of the right-bottom luma location of the current luma prediction block is defined by $$xPRb = xP + nPbW \quad (2\text{-}2)$$

and the variable colPb is set as the luma prediction block covering the modified location given by ((xPRb>>4)<<4, (yPRb>>4)<<4) inside the colPic.

Otherwise ((yP>>Log 2CtbSizeY) is not equal to (yPRb>>Log 2CtbSizeY)), colPb is marked as "unavailable".

2. When colPb is coded in an intra prediction mode or colPb is marked as "unavailable", the following applies.

Central luma location of the current prediction block is defined by $$xPCtr = (xP + (nPbW >> 1)) \quad (2\text{-}3)$$

$$yPCtr = (yP + (nPbH >> 1)) \quad (2\text{-}4)$$

The variable colPb is set as the luma prediction block covering the modified location given by ((xPCtr>>4)<<4, (yPCtr>>4)<<4) inside the colPic.

3. (xPCol, yPCol) is set equal to the top-left sample of the colPb relative to the top-left luma sample of the colPic.

refIdxLX is set to be refIdxLXA if all of the following conditions are true.

mergeTMVP is equal to 1.

LongTermRefPic(currPic, refIdxLX, ListX) is not equal to LongTermRefPic(colPic, refIdxCol, listCol).

refIdxLXA is larger than 0.

The variables mvLXCol and availableFlagLXCol are derived as follows.

If one or more of the following conditions are true, both components of mvLXCol are set equal to 0 and availableFlagLXCol is set equal to 0.

colPb is coded in an intra prediction mode.

colPb is marked as "unavailable".

slice_temporal_mvp_enable_flag is equal to 0.

LongTermRefPic(currPic, refIdxLX, ListX) is not equal to LongTermRefPic(colPic, refIdxCol, listCol).

Otherwise, the motion vector mvCol, the reference index refIdxCol, and the reference list identifier listCol are derived as follows.

If PredFlagL0[xPCol][yPCol] is equal to 0, mvCol, refIdxCol, and listCol are set equal to MvL1[xPCol][yPCol], RefIdxL1[xPCol][yPCol], and L1, respectively.

Otherwise (PredFlagL0[xPCol][yPCol] is equal to 1), the following applies.

If PredFlagL1[xPCol][yPCol] is equal to 0, mvCol, refIdxCol, and listCol are set equal to MvL0[xPCol][yPCol], RefIdxL0[xPCol][yPCol], and L0, respectively.

Otherwise (PredFlagL1[xPCol][yPCol] is equal to 1), the following assignments are made.

If PicOrderCnt(pic) of every picture pic in every reference picture lists is less than or equal to PicOrderCntVal, mvCol, refIdxCol, and listCol are set equal to MvLX[xPCol][yPCol], RefIdxLX[xPCol][yPCol] and LX, respectively with X being the value of X this process is invoked for.

Otherwise (PicOrderCnt(pic) of at least one picture pic in at least one reference picture list is greater than PicOrderCntVal, mvCol, refIdxCol and listCol are set equal to MvLN[xPCol][yPCol], RefIdxLN[xPCol][yPCol] and LN, respectively with N being the value of collocated_from_l0_flag.

and the variable availableFlagLXCol is set equal to 1 and the following applies.

If RefPicListX[refIdxLX] is a long-term reference picture, or PicOrderCnt(colPic)−RefPicOrderCnt(colPic, refIdxCol, listCol) is equal to PicOrderCntVal−PicOrderCnt(RefPicListX[refIdxLX]), $$mvLXCol = mvCol \quad (2\text{-}5)$$

Otherwise, mvLXCol is derived as scaled version of the motion vector mvCol as specified below $$tx = (16384 + (Abs(td) >> 1))/td \quad (2\text{-}6)$$

$$distScaleFactor = Clip3(-4096, 4095, (tb*tx+32)>>6) \quad (2\text{-}7)$$

$$mvLXCol = Clip3(-32768, 32767, Sign2 \\ (distScaleFactor*mvCol)*((Abs \\ (distScaleFactor*mvCol)+127)>>8)) \quad (2\text{-}8)$$

where td and tb are derived as $$td = Clip3(-128, 127, PicOrderCnt(colPic) - RefPicOrderCnt(colPic, refIdxCol, listCol)) \quad (2\text{-}9)$$

$$tb = Clip3(-128, 127, PicOrderCntVal - PicOrderCnt(RefPicListX[refIdxLX])) \quad (2\text{-}10)$$

1.1.1 Alternative Implementation to Apply with HEVC WD9

The refIdxLXA (with X being equal to 0 or 1) can be derived as described in the example above or signaled/set otherwise. The modifications are in italicization for additions or bracketed and preceded by "removed" for removals. The following example is similar to that described above, with some updated text for temporal motion vector prediction.

8.5.3.1.7 Derivation Process for Temporal Luma Motion Vector Prediction

Inputs to this process are
a luma location (xP, yP) specifying the top-left sample of the current luma prediction block relative to the top-left luma sample of the current picture,
variables specifying the width and the height of the luma prediction block, nPbW and nPbH,
a variable mergeTMVP,
a reference index refIdxLX (with X being 0 or 1).

Outputs of this process are
the motion vector prediction mvLXCol,
the availability flag availableFlagLXCol.

The variable currPb specifies the current luma prediction block at luma location (xP, yP).

The variables mvLXCol and availableFlagLXCol are derived as follows.

If slice_temporal_mvp_enable_flag is equal to 0, both components of mvLXCol are set equal to 0 and availableFlagLXCol is set equal to 0.

Otherwise, the following ordered steps apply.

1. Depending on the values of slice_type, collocated_from_l0_flag, and collocated_ref_idx, the variable colPic, specifying the picture that contains the collocated partition, is derived as follows.
   If slice_type is equal to B and collocated_from_l0_flag is equal to 0, the variable colPic specifies the picture that contains the collocated partition as specified by RefPicList1[collocated_ref_idx].
   Otherwise (slice_type is equal to B and collocated_from_l0_flag is equal to 1 or slice_type is equal to P), the variable colPic specifies the picture that contains the collocated partition as specified by RefPicList0[collocated_ref_idx].

2. The bottom right collocated motion vector is derived as follows $$xPRb=xP+nPbW \quad (8\text{-}162)$$

$$yPRb=yP+nPbH \quad (8\text{-}163)$$

If (yP>>Log 2CtbSizeY) is equal to (yPRb>>Log 2CtbSizeY), and xPRb is less than pic_width_in_luma_samples, the following applies.
   The variable colPb specifies the luma prediction block covering the modified location given by ((xPRb>>4)<<4, (yPRb>>4)<<4) inside the collocated picture specified by colPic.
   The luma location (xPCol, yPCol) is set equal to the top-left sample of the of the collocated luma prediction block specified by colPb relative to the top-left luma sample of the collocated picture specified by colPic.
   The derivation process for collocated motion vectors as specified in subclause 8.5.3.1.8 is invoked with currPb, colPic, colPb, (xPCol, yPCol), mergeTMVP, and refIdxLX as inputs and the output being assigned to mvLXCol and availableFlagLXCol.
Otherwise, both components of mvLXCol are set equal to 0 and availableFlagLXCol is set equal to 0.

3. When availableFlagLXCol is equal to 0, the central collocated motion vector is derived as follows.

$$xPCtr=xP+(nPbW>>1) \quad (8\text{-}164)$$

$$yPCtr=yP+(nPbH>>1) \quad (8\text{-}165)$$

The variable colPb specifies the luma prediction block covering the modified location given by ((xPCtr>>4)<<4, (yPCtr>>4)<<4) inside the colPic.
The luma location (xPCol, yPCol) is set equal to the top-left sample of the of the collocated luma prediction block specified by colPb relative to the top-left luma sample of the collocated picture specified by colPic.
The derivation process for collocated motion vectors as specified in subclause 8.5.3.1.8 is invoked with currPb, colPic, colPb, (xPCol, yPCol), mergeTMVP, and refIdxLX as inputs and the output being assigned to mvLXCol and availableFlagLXCol.

8.5.3.1.8 Derivation Process for Collocated Motion Vectors

Inputs to this process are
currPb specifying the current prediction block,
colPic specifying the collocated picture,
colPb specifying the collocated prediction block inside the collocated picture specified by colPic,
a luma location (xPCol, yPCol) specifying the top-left sample of the collocated luma prediction block specified by colPb relative to the top-left luma sample of the collocated picture specified by colPic,
a variable mergeTMVP,
a reference index refIdxLX (with X being 0 or 1).

Outputs of this process are
the motion vector prediction mvLXCol,
the availability flag availableFlagLXCol.

The variable currPic specifies the current picture.

The arrays predFlagLXCol[x][y], mvLXCol[x][y] and refIdxLXCol[x][y] are set equal to the corresponding arrays of the collocated picture specified by colPic, PredFlagLX[x][y], MvLX[x][y] and RefIdxLX[x][y], respectively with X being the value of X this process is invoked for.

The variables mvLXCol and availableFlagLXCol are derived as follows.

If colPb is coded in an intra prediction mode, both components of mvLXCol are set equal to 0 and availableFlagLXCol is set equal to 0.

Otherwise, the motion vector mvCol, the reference index refIdxCol, and the reference list identifier listCol are derived as follows.

If predFlagL0Col[xPCol][yPCol] is equal to 0, mvCol, refIdxCol, and listCol are set equal to mvL1Col[xPCol][yPCol], refIdxL1Col[xPCol][yPCol], and L1, respectively.

Otherwise if predFlagL0Col[xPCol][yPCol] is equal to 1 and predFlagL1Col[xPCol][yPCol] is equal to 0, mvCol, refIdxCol, and listCol are set equal to mvL0Col[xPCol][yPCol], refIdxL0Col[xPCol][yPCol], and L0, respectively.

Otherwise (predFlagL0Col[xPCol][yPCol] is equal to 1 and predFlagL1Col[xPCol][yPCol] is equal to 1), the following assignments are made.

If DiffPicOrderCnt(currPic, pic) is less than or equal to 0 for every picture pic in every reference picture list of the current slice, mvCol, refIdxCol, and listCol are set equal to mvLXCol[xPCol][yPCol], refIdxLXCol[xPCol][yPCol] and LX, respectively with X being the value of X this process is invoked for.

Otherwise, mvCol, refIdxCol and listCol are set equal to mvLNCol[xPCol][yPCol], refIdxLNCol [xPCol][yPCol] and LN, respectively with N being the value of collocated_from_l0_flag.

and mvLXCol and availableFlagLXCol are derived as follows.

When [removed: "If"] LongTermRefPic(currPic, currPb, refIdxLX, LX) is not equal to LongTermRefPic (colPic, colPb, refIdxCol, listCol), the following applies If refIdxLXA is larger than 0, and mergeTMVP is equal to 1, refIdxLX is set to refIdxLXA and availableFlagLXCol is set to 1.

Otherwise, both components of mvLXCol are set equal to 0 and availableFlagLXCol is set equal to 0.

[removed: "Otherwise,"] When the variable availableFlagLXCol is set equal to 1, refPicListCol[refIdxCol] is set to be the picture with reference index refIdxCol in the reference picture list listCol of the slice containing prediction block currPb in the picture colPic, and the following applies.

colPocDiff=DiffPicOrderCnt(colPic,refPicListCol [refIdxCol])     (8-166)

currPocDiff=DiffPicOrderCnt(currPic,RefPicList$X$ [refIdx$LX$])     (8-167)

If RefPicListX[refIdxLX] is a long-term reference picture, or colPocDiff is equal to currPocDiff, mvLXCol is derived as:

$mvLX$Col=$mv$Col     (8-168)

Otherwise, mvLXCol is derived as scaled version of the motion vector mvCol as specified below.

$tx$=(16384+(Abs($td$)>>1))/$td$     (8-169)

distScaleFactor=Clip3(−4096,4095,($tb$*$tx$+32)>>6)     (8-170)

$mvLX$Col=Clip3(−32768,32767,Sign (distScaleFactor*$mv$Col)*((Abs (distScaleFactor*$mv$Col)+127)>>8))     (8-171)

where td and tb are derived as $td$=Clip3(−128,127,colPocDiff)     (8-172)

$tb$=Clip3(−128,127,currPocDiff)     (8-173)

The coding gain of the proposed method compared to the anchor for texture views coding in 3-view case is described below. Table 1 shows the average coding gain of the proposed method with respect to HTM4.0 anchor. The column denoted by 'Video only' lists the coding gain of all three texture views where the bitrates represent the total bitrates of bitstreams containing three texture views and the PSNR values are the average PSNR values of the three decoded texture views. Bitrate savings for "Video 1" and "Video 2" are also listed in this table. Note that "Video 0" corresponds to the base view, while "Video 1" and "Video 2" indicate the non-base views (texture only).

As shown in Table 1, the overall average bitrate saving is around 0.94% for all texture views and the saving of the non-base views is about 2.5%.

TABLE 1

Coding gain with respect to HTM4.0 anchor

|  | Video 0 | Video 1 | Video 2 | Video only |
|---|---|---|---|---|
| Balloons | 0.0% | −3.13% | −2.94% | −1.39% |
| Kendo | 0.0% | −2.42% | −2.28% | −1.03% |
| Newspapercc | 0.0% | −1.55% | −1.17% | −0.59% |
| GhostTownFly | 0.0% | −5.62% | −5.38% | −1.54% |
| PoznanHall2 | 0.0% | −1.61% | −1.24% | −0.64% |
| PoznanStreet | 0.0% | −2.12% | −2.01% | −0.71% |
| UndoDancer | 0.0% | −1.86% | −1.90% | −0.69% |
| 1024 × 768 | 0.0% | −2.37% | −2.13% | −1.00% |
| 1920 × 1088 | 0.0% | −2.80% | −2.63% | −0.90% |
| average | 0.0% | −2.62% | −2.42% | −0.94% |

Figure 7:
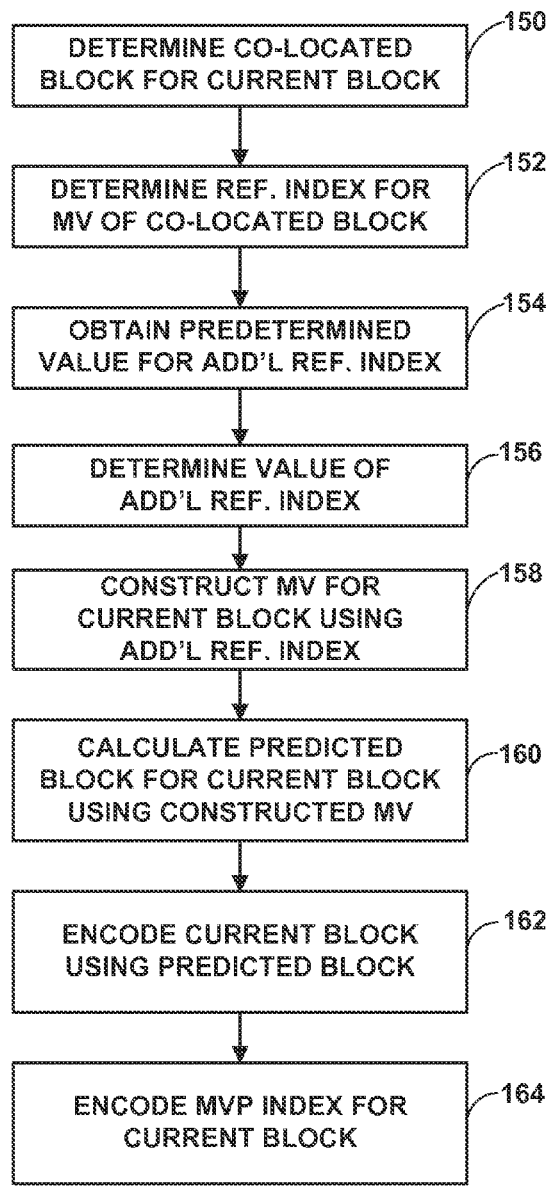
FIG. 7 is a flowchart illustrating an example method of encoding a block of video data in accordance with the techniques of this disclosure.

FIG. 7 is a flowchart illustrating an example method of encoding a block of video data in accordance with the techniques of this disclosure. For purposes of explanation, FIG. 7 is described with respect to video encoder 20 of FIGS. 1 and 2. However, it should be understood that the method of FIG. 7 may be performed by other devices for encoding video data. Likewise, certain steps of the method of FIG. 7 may be performed in different orders or in parallel.

Although not shown in the example of FIG. 7, video encoder 20 may initially determine that a motion vector for a current block is to be encoded using merge mode. Video encoder 20 may construct a set of candidate motion vector predictors representing motion vectors of spatially neighboring blocks to the current block as well as a co-located block to the current block in another picture. A motion vector of the co-located block represents an example of a temporal motion vector predictor (TMVP). For instance, as shown in FIG. 6, the current block may correspond to block 104, the co-located block may correspond to block 110, and motion vector 116 may represent an example of a TMVP for block 104. It is presumed, in the example of FIG. 7, that video encoder 20 selects the TMVP for the current block when encoding the motion vector for the current block using merge mode.

Thus, video encoder 20 may determine a co-located block for the current block (150). Video encoder 20 may further determine a reference index for a motion vector of the co-located block (152). The reference index for the motion vector of the co-located block corresponds to a reference picture to which the motion vector of the co-located block points. In this example, it is presumed that the motion vector of the co-located block is a disparity motion vector, i.e., an inter-view motion vector, such that the reference picture to which the motion vector points is an inter-view reference picture, which may be characterized as a long-term reference picture. Thus, the reference index for the motion vector of the co-located block may correspond to a reference picture having the same picture order count (POC) value as a picture including the co-located block.

Because inter-view prediction is enabled between pictures having the same POC value, absent the techniques of this disclosure, the motion vector of the co-located block would generally be considered unavailable for use in merge mode motion vector coding. That is, if the motion vector of the co-located block were used in strict merge mode as a motion vector of the current block, then the motion vector for the current block would refer to a reference block of a reference picture having a different POC value than the current picture including the current block.

However, using the techniques of this disclosure, video encoder 20 may obtain a predetermined value for an additional reference index (154). For instance, video encoder 20 may determine the predetermined value based on a video coding standard or an extension to a video coding standard, assigning the value, receiving the value from a user, or otherwise determine the predetermined value. Video encoder 20 may then determine a value of an additional reference index (156), namely, as being equal to the predetermined value. For instance, the predetermined value may be equal to 0 (zero) or −1 (negative one). In some examples, video encoder 20 may encode data representing the predetermined value, e.g., in a slice header of a slice including the current block, a picture parameter set (PPS) for a picture including the current block, a sequence parameter set (SPS) for a sequence including the picture, or a video parameter set (VPS).

Video encoder 20 may then construct a motion vector (MV) for the current block using the additional reference index (158). In one example, video encoder 20 may cause the motion vector for the current block to inherit motion parameters of the TMVP, such as a reference picture list, a horizontal motion component, and a vertical motion component. In general, a motion vector may be defined by a horizontal motion component and a vertical motion component, where the horizontal motion component defines the horizontal position of a reference block relative to the position of the current block, and the vertical motion component defines the vertical position of the reference block relative to the position of the current block.

Likewise, the reference picture list is a list of potential reference pictures. A reference index identifies the actual reference picture to be used in the reference picture list. In conventional merge mode, a reference index and a reference picture list would be inherited from a motion vector predictor. However, in accordance with the techniques of this disclosure, the reference picture list may be inherited from the motion vector predictor, but the additional reference index, having a value equal to the predetermined value, may be used to construct the motion vector for the current block. Therefore, the constructed motion vector for the current block may have a reference picture list identifier equal to a reference picture list identifier of the TMVP, a horizontal motion component equal to a horizontal motion component of the TMVP, a vertical motion component equal to a vertical motion component of the TMVP, and a reference index equal to the predetermined value (i.e., the additional reference index).

Video encoder 20 may calculate a predicted block for the current block using the constructed motion vector (160). For instance, video encoder 20 may identify a reference picture using the reference picture list of the constructed motion vector and a reference index of the constructed motion vector, which may be equal to the predetermined value and the additional reference index. Video encoder 20 may then identify a reference block in the reference picture as being located at the position of the current block, shifted horizontally by the horizontal motion component of the constructed motion vector and vertically by the vertical motion component of the constructed motion vector. Calculating the predicted block may further include interpolation if the motion vector has fractional pixel precision.

Video encoder 20 may then encode the current block using the predicted block (162). For instance, video encoder 20 may calculate a residual block using pixel-by-pixel differences between the original block for the current block and the predicted block. Video encoder 20 may further transform and quantize the residual block, then entropy encode the resulting quantized transform coefficients. Video encoder 20 may further encode a motion vector predictor (MVP) index for the current block (164). In this example, the MVP index corresponds to the TMVP candidate in a set of motion vector predictor candidates. Likewise, video encoder 20 may encode data indicating that merge mode is to be used to code a motion vector for the current block, and that TMVP is enabled for merge mode.

In this manner, the method of FIG. 7 represents an example of a method including determining a first target reference index representing a reference picture to which a candidate motion vector predictor for a current motion vector refers, determining, for the candidate motion vector predictor and during temporal motion vector prediction (TMVP) of the current motion vector, a value for an additional target reference index that is equal to a predetermined value, and coding (i.e., encoding in this example) the current motion vector based at least in part on the value of the additional reference index. In particular, the first target reference index may correspond to the reference index of the TMVP, the TMVP corresponding to the motion vector of the co-located block. The candidate motion vector predictor may correspond to the TMVP. The current motion vector may correspond to the motion vector of the current block.

Figure 8:
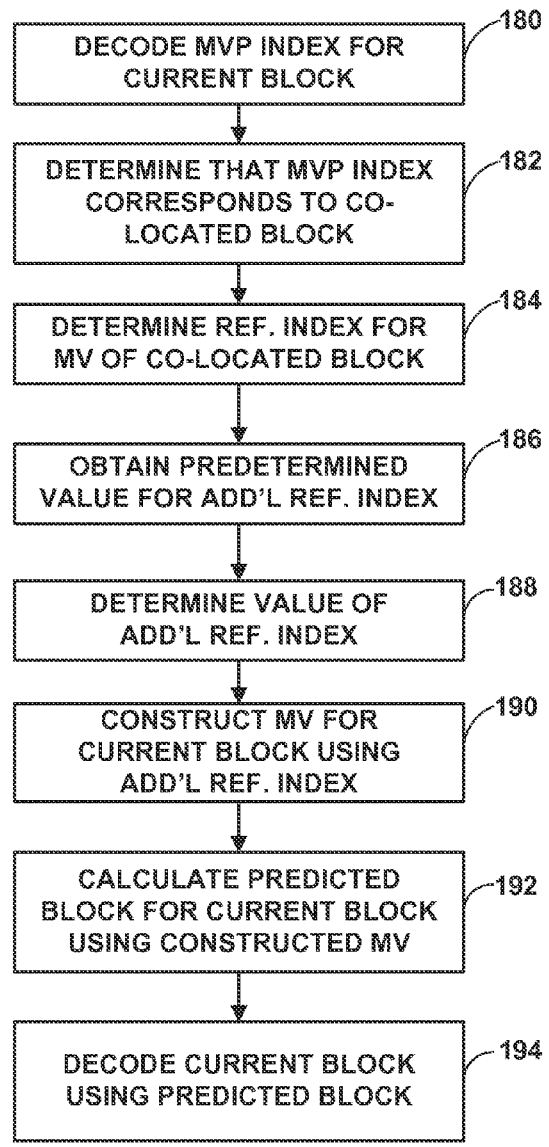
FIG. 8 is a flowchart illustrating an example method of decoding a block of video data in accordance with the techniques of this disclosure.

FIG. 8 is a flowchart illustrating an example method of decoding a block of video data in accordance with the techniques of this disclosure. For purposes of explanation, FIG. 8 is described with respect to video decoder 30 of FIGS. 1 and 3. However, it should be understood that the method of FIG. 8 may be performed by other devices for decoding video data. Likewise, certain steps of the method of FIG. 8 may be performed in different orders or in parallel.

Initially, video decoder 30 may decode a motion vector predictor (MVP) index for a current block (180). In addition, video decoder 30 may decode data indicating that a motion vector for the current block is to be decoded using merge mode, and that temporal motion vector prediction is enabled for merge mode. Video decoder 30 may then determine that the decoded MVP index corresponds to a co-located block to the current block (182), that is, a block having the same or substantially the same position as the current block but in a different picture. In other words, the MVP index may correspond to a temporal motion vector predictor (TMVP).

Video decoder 30 may then determine a reference index for a motion vector of the co-located block (184). Video decoder 30 may also obtain a predetermined value for an additional reference index (186). For instance, video decoder 30 may determine the predetermined value from a slice header of a slice including the current block, a PPS, an SPS, a VPS, or other such signaling data. Video decoder 30 may then determine that a value of an additional reference index is equal to the predetermined value (188).

Video decoder 30 may then construct a motion vector (MV) for the current block using the additional reference index (190). As explained with respect to FIG. 7, video decoder 30 may cause the motion vector for the current block to inherit a reference picture list identifier, horizontal motion component, and vertical motion component from the TMVP, but to use the additional reference index as an index into the reference picture list identified by the reference picture list identifier to determine the reference picture in which a reference block for the current block is to be found.

Thus, video decoder 30 may use the constructed motion vector to calculate a predicted block for the current block using the constructed motion vector (192). For instance, again as explained above, the horizontal and vertical motion components may define the position of the reference block in the reference picture relative to the position of the current block. Again, video decoder 30 may perform pixel interpolation if the motion vector has sub-pixel precision.

Video decoder 30 may then decode the current block using the predicted block (194). For instance, video decoder 30 may decode quantized transform coefficients from the bitstream. Video decoder 30 may then inverse quantize and inverse transform the coefficients to reproduce a residual block for the current block. Next, video decoder 30 may combine the predicted block and the residual block, on a pixel-by-pixel basis, to reconstruct the current block.

In this manner, the method of FIG. 8 represents an example of a method including determining a first target reference index representing a reference picture to which a candidate motion vector predictor for a current motion vector refers, determining, for the candidate motion vector predictor and during temporal motion vector prediction (TMVP) of the current motion vector, a value for an additional target reference index that is equal to a predetermined value, and coding (i.e., decoding in this example) the current motion vector based at least in part on the value of the additional reference index.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   determining a first target reference index representing a first reference picture to which a candidate motion vector predictor for a current motion vector refers;
   coding at least one of a slice header or a picture parameter set (PPS) including data representing a predetermined value for an additional target reference index representing a second reference picture different than the first reference picture;
   determining that the first reference picture comprises a long-term reference picture; and
   in response to determining that the first reference picture comprises the long-term reference picture, coding, during temporal motion vector prediction (TMVP) of the current motion vector using the candidate motion vector predictor, the current motion vector such that a reference index for the current motion vector has the predetermined value of the additional target reference index instead of the first target reference index of the candidate motion vector predictor.

2. The method of claim 1, wherein determining the value for the additional target reference index further comprises determining whether the additional target reference index is available based at least in part on the predetermined value.

3. The method of claim 1, wherein the additional target reference index comprises one of a reference index value into reference picture list 0 (refIdxL0A) or a reference index value into reference picture list 1 (refIdxL1A).

4. The method of claim 1,
wherein coding comprises coding the current motion vector using merge mode, comprising:
inheriting motion parameters for the current motion vector from the candidate motion vector predictor, wherein the inherited motion parameters include a reference picture list identifier, a horizontal motion component, and a vertical motion component; and
using the value of the additional target reference index to identify the second reference picture to which the current motion vector refers in the reference picture list,
the method further comprising coding a current block using the horizontal motion component, the vertical motion component, and the second reference picture identified by the additional target reference index in the reference picture list.

5. The method of claim 1, wherein determining the value for the additional target reference index comprises determining the value for the additional target reference index only when video data including the current motion vector conforms to an extension of a base video coding standard.

6. The method of claim 5, wherein the base video coding standard comprises High Efficiency Video Coding (HEVC), and wherein the extension comprises one of a multiview video coding extension of HEVC (MV-HEVC) or a scalable video coding extension of HEVC (SHVC).

7. The method of claim 1, further comprising coding data representing the predetermined value, wherein the data comprises data of a slice including a block corresponding to the current motion vector.

8. The method of claim 7, wherein coding the data representing the predetermined value comprises at least one of:
coding the data in a portion of a slice header for the slice conforming to an extension of a base video coding standard; or
coding the data in a portion of the slice header for the slice conforming to the base video coding standard.

9. The method of claim 1, further comprising coding data representing the predetermined value in at least one of a sequence parameter set (SPS) for a sequence including a picture including a block corresponding to the current motion vector or a video parameter set (VPS).

10. The method of claim 1, further comprising, when the predetermined value is a non-zero value, determining that the second reference picture has a different type than a type for a reference picture identified by reference index 0.

11. The method of claim 1, wherein coding the motion vector comprises decoding the motion vector, the method further comprising decoding a current block using the motion vector.

12. The method of claim 1, wherein coding the motion vector comprises encoding the motion vector, the method further comprising encoding a current block using the motion vector.

13. A device for coding video data, the device comprising:
a memory configured to store video data; and
a video coder configured to:
determine a first target reference index representing a first reference picture of the video data to which a candidate motion vector predictor for a current motion vector refers,
code at least one of a slice header or a picture parameter set (PPS) including data representing a predetermined value for an additional target reference index representing a second reference picture different than the first reference picture,
determine that the first reference picture comprises a long-term reference picture, and
in response to determining that the first reference picture comprises the long-term reference picture, code, during temporal motion vector prediction (TMVP) of the current motion vector using the candidate motion vector predictor, the current motion vector such that a reference index for the current motion vector has the predetermined value of the additional target reference index instead of the first target reference index of the candidate motion vector predictor.

14. The device of claim 13, wherein the video coder is configured to code the current motion vector using merge mode in which the current motion vector inherits motion parameters from the candidate motion vector predictor, wherein the inherited motion parameters include a reference picture list identifier, a horizontal motion component, and a vertical motion component, and wherein the video coder is configured to use the value of the additional target reference index to identify the second reference picture to which the current motion vector refers in the reference picture list and to code a current block using the horizontal motion component, the vertical motion component, and the second reference picture identified by the additional target reference index in the reference picture list.

15. The device of claim 13, wherein the video coder is configured to determine the value for the additional target reference index only when video data including the current motion vector conforms to an extension of a base video coding standard.

16. The device of claim 13, wherein the video coder is configured to code data representing the predetermined value in at least one of a sequence parameter set (SPS) for a sequence including a picture including a block corresponding to the current motion vector or a video parameter set (VPS).

17. The device of claim 13, wherein the video coder is configured to determine, when the predetermined value is a non-zero value, that the second reference picture has a different type than a type for a reference picture identified by reference index 0.

18. The device of claim 13, wherein the video coder comprises at least one of a video decoder or a video encoder.

19. A device for coding video data, the device comprising:
means for determining a first target reference index representing a first reference picture to which a candidate motion vector predictor for a current motion vector refers;
means for coding at least one of a slice header or a picture parameter set (PPS) including data representing a predetermined value for an additional target reference index representing a second reference picture different than the first reference picture;
means for determining that the first reference picture comprises a long-term reference picture; and
means for coding, in response to determining that the first reference picture comprises the long-term reference picture, the current motion vector, during temporal motion vector prediction (TMVP) of the current motion vector using the candidate motion vector predictor, such that a reference index for the current motion vector has the predetermined value of the additional target reference index.

20. The device of claim 19, wherein the means for coding comprises means for coding the current motion vector using merge mode, comprising:
- means for inheriting motion parameters for the current motion vector from the candidate motion vector predictor, wherein the inherited motion parameters include a reference picture list identifier, a horizontal motion component, and a vertical motion component; and
- means for using the value of the additional target reference index to identify the second reference picture to which the current motion vector refers in the reference picture list,
- further comprising means for coding a current block using the horizontal motion component, the vertical motion component, and the second reference picture identified by the additional target reference index in the reference picture list.

21. The device of claim 19, wherein the means for determining the value for the additional target reference index comprises means for determining the value for the additional target reference index only when video data including the current motion vector conforms to an extension of a base video coding standard.

22. The device of claim 19, further comprising means for coding data representing the predetermined value in at least one of a sequence parameter set (SPS) for a sequence including a picture including a block corresponding to the current motion vector or a video parameter set (VPS).

23. The device of claim 19, further comprising means for determining, when the predetermined value is a non-zero value, that the second reference picture has a different type than a type for a reference picture identified by reference index 0.

24. The device of claim 19, wherein the means for coding comprise at least one of means for decoding the current motion vector or means for encoding the current motion vector.

25. A non-transitory computer-readable storage medium having stored thereon instructions that, when executed, cause a processor to:
- determine a first target reference index representing a reference picture to which a candidate motion vector predictor for a current motion vector refers;
- code at least one of a slice header or a picture parameter set (PPS) including data representing a predetermined value for an additional target reference index representing a second reference picture different than the first reference picture;
- determine that the first reference picture comprises a long-term reference picture; and
- in response to determining that the first reference picture comprises the long-term reference picture, code, during temporal motion vector prediction (TMVP) of the current motion vector using the candidate motion vector predictor, the current motion vector such that a reference index for the current motion vector has the predetermined value of the additional target reference index instead of the first target reference index of the candidate motion vector predictor.

26. The non-transitory computer-readable storage medium of claim 25, wherein the instructions that cause the processor to code comprise instructions that cause the processor to code the current motion vector using merge mode, comprising instructions that cause the processor to:
- inherit motion parameters for the current motion vector from the candidate motion vector predictor, wherein the inherited motion parameters include a reference picture list identifier, a horizontal motion component, and a vertical motion component; and
- use the value of the additional target reference index to identify the second reference picture to which the current motion vector refers in the reference picture list,
- further comprising instructions that cause the processor to code a current block using the horizontal motion component, the vertical motion component, and the second reference picture identified by the additional target reference index in the reference picture list.

27. The non-transitory computer-readable storage medium of claim 25, wherein the instructions that cause the processor to determine the value for the additional target reference index comprise instructions that cause the processor to determine the value for the additional target reference index only when video data including the current motion vector conforms to an extension of a base video coding standard.

28. The non-transitory computer-readable storage medium of claim 25, further comprising instructions that cause the processor to code data representing the predetermined value in at least one of a sequence parameter set (SFS) for a sequence including a picture including a block corresponding to the current motion vector or a video parameter set (VPS).

29. The non-transitory computer-readable storage medium of claim 25, further comprising instructions that cause the processor to, when the predetermined value is a non-zero value, determine that the second reference picture has a different type than a type for a reference picture identified by reference index 0.

30. The non-transitory computer-readable storage medium of claim 25, wherein the instructions that cause the processor to code the motion vector comprise at least one of instructions that cause the processor to decode the motion vector or instructions that cause the processor to encode the motion vector.

* * * * *